(12) United States Patent
Juneau

(10) Patent No.: US 8,671,457 B2
(45) Date of Patent: Mar. 11, 2014

(54) METHOD AND SYSTEM FOR IDENTIFYING AND CORRECTING LOCATION DISCREPANCIES FOR RECEPTION EQUIPMENT IN A CONTENT DELIVERY NETWORK

(75) Inventor: J. Rene Juneau, Ontario (CA)

(73) Assignee: Maxxian Technology Inc., Ontario (CA)

( * ) Notice: Subject to any disclaimer, the term of this patent is extended or adjusted under 35 U.S.C. 154(b) by 566 days.

(21) Appl. No.: 11/422,249

(22) Filed: Jun. 5, 2006

(65) Prior Publication Data
US 2006/0259984 A1 Nov. 16, 2006

Related U.S. Application Data

(63) Continuation-in-part of application No. 10/964,621, filed on Oct. 15, 2004.

(60) Provisional application No. 60/687,138, filed on Jun. 3, 2005, provisional application No. 60/790,711, filed on Apr. 10, 2006.

(51) Int. Cl.
*G06F 21/00* (2013.01)

(52) U.S. Cl.
USPC ............. 726/28; 726/26; 726/27; 380/247; 380/248; 380/249; 380/250; 713/187

(58) Field of Classification Search
USPC ............. 726/27–30; 380/247–250; 713/187
See application file for complete search history.

(56) References Cited

U.S. PATENT DOCUMENTS

| 4,461,032 | A | 7/1984 | Skerlos |
| 4,510,623 | A | 4/1985 | Bonneau et al. |
| 4,975,951 | A | 12/1990 | Bennett |
| 5,146,496 | A | 9/1992 | Westerfer et al. |
| 5,224,161 | A | 6/1993 | Daniel et al. |
| 5,251,324 | A | 10/1993 | McMullan, Jr. |
| 5,438,620 | A * | 8/1995 | Ryan et al. ............ 380/218 |

(Continued)

FOREIGN PATENT DOCUMENTS

| JP | 2000-244284 A | 9/2000 |
| WO | WO 02-054765 A1 | 7/2002 |

OTHER PUBLICATIONS

U.S. Appl. No. 10/575,908, filed Jul. 21, 2006, Notice of Allowance mailed Jan. 25, 2011, 10 pages.

(Continued)

*Primary Examiner* — Philip Chea
*Assistant Examiner* — Ghazal Shehni
(74) *Attorney, Agent, or Firm* — Kilpatrick Townsend & Stockton LLP

(57) ABSTRACT

A method and system is provided to analyse receiver indicia of location for a set of at least one receivers to determine whether a receiver has an erroneous indicator of location. The embodiment may take further steps to confirm whether or not inappropriate usage has occurred. The method and system includes identifying a first indicia of location for a set of one or more receivers, identifying a second indicia of location for one or more receivers from the set, and determining if the first and second indicia of location are mutually inconsistent. Indicia of location include indicators of receiver location, inventory state, communication path and definition on systems. The method and system may optionally include action to report or correct the location error.

30 Claims, 12 Drawing Sheets

(56) References Cited

U.S. PATENT DOCUMENTS

| | | | |
|---|---|---|---|
| 5,485,518 A | 1/1996 | Hunter et al. | |
| 5,621,793 A | 4/1997 | Bednarek et al. | |
| 5,828,402 A * | 10/1998 | Collings | 725/28 |
| 5,859,874 A * | 1/1999 | Wiedeman et al. | 375/267 |
| 5,867,226 A | 2/1999 | Wehmeyer et al. | |
| 5,880,769 A | 3/1999 | Nemirofsky et al. | |
| 5,905,859 A * | 5/1999 | Holloway et al. | 726/22 |
| 5,970,206 A | 10/1999 | Yuen et al. | |
| 6,009,116 A | 12/1999 | Bednarek et al. | |
| 6,011,973 A * | 1/2000 | Valentine et al. | 455/456.6 |
| 6,035,037 A | 3/2000 | Chaney | |
| 6,057,756 A * | 5/2000 | Engellenner | 340/505 |
| 6,067,440 A * | 5/2000 | Diefes | 725/27 |
| 6,154,206 A | 11/2000 | Ludtke | |
| 6,177,931 B1 | 1/2001 | Alexander et al. | |
| 6,381,747 B1 | 4/2002 | Wonfor et al. | |
| 6,389,538 B1 | 5/2002 | Gruse et al. | |
| 6,553,413 B1 * | 4/2003 | Leighton et al. | 709/219 |
| 6,754,908 B1 | 6/2004 | Medvinsky | |
| 7,028,335 B1 * | 4/2006 | Borella et al. | 726/11 |
| 7,519,811 B1 * | 4/2009 | Hara | 713/151 |
| 7,530,108 B1 | 5/2009 | Cocchi et al. | |
| 2002/0021665 A1 | 2/2002 | Bhagavath et al. | |
| 2002/0087663 A1 * | 7/2002 | Chou et al. | 709/219 |
| 2002/0092015 A1 | 7/2002 | Sprunk et al. | |
| 2002/0104083 A1 | 8/2002 | Hendricks et al. | |
| 2003/0018445 A1 | 1/2003 | Vince et al. | |
| 2003/0097657 A1 | 5/2003 | Zhou et al. | |
| 2004/0055010 A1 | 3/2004 | Fries et al. | |
| 2004/0123329 A1 | 6/2004 | Williams et al. | |
| 2004/0153668 A1 * | 8/2004 | Saip et al. | 713/201 |
| 2004/0194124 A1 | 9/2004 | Medvinsky | |
| 2005/0055709 A1 * | 3/2005 | Thompson | 725/30 |
| 2005/0108529 A1 | 5/2005 | Juneau | |
| 2006/0053279 A1 * | 3/2006 | Coueignoux | 713/154 |
| 2007/0076872 A1 | 4/2007 | Juneau | |

OTHER PUBLICATIONS

U.S. Appl. No. 10/575,908, filed Jul. 21, 2006, Office Action dated May 11, 2010, 50 pages.
U.S. Appl. No. 10/964,621, filed Oct. 15, 2004, Office Action dated Nov. 20, 2007, 20 pages.
U.S. Appl. No. 10/964,621, filed Oct. 15, 2004, Final Office Action dated Jul. 9, 2008, 20 pages.
U.S. Appl. No. 10/964,621, filed Oct. 15, 2004, Advisory Action dated Sep. 18, 2008, 4 pages.
U.S. Appl. No. 10/964,621, filed Oct. 15, 2004, Office Action dated Mar. 9, 2009, 23 pages.
U.S. Appl. No. 10/964,621, filed Oct. 15, 2004, Final Office Action dated Dec. 23, 2009, 28 pages.
U.S. Appl. No. 10/964,621, filed Oct. 15, 2004, Advisory Action dated Mar. 26, 2010, 3 pages.
U.S. Appl. No. 10/964,621, filed Oct. 15, 2004, Office Action dated Aug. 5, 2010, 24 pages.

* cited by examiner

| General info | | | | | | | | |
|---|---|---|---|---|---|---|---|---|
| Serial | GI1401ZZ1234 | Type | DCT5000 TWOWAY | Active | | 1 | On plant | 1 |
| System | MX | Channel map | MX HD MAP | Billing Code | | 1234 | Billing System | MX |
| Last Response | 2004/11/05 05:04:00 US/Eastern | | Last Resp. Fail | 2004/10/24 05:11:53 GMT-4 | | | | |
| Downstream configuration | | | | | | | | |
| Plant | MX DSP1 | Device | mxradd | Path | | 863 | | |
| Upstream configuration | | | | | | | | |
| Plant | MX USP1 | Device | maxrpd010 | Demod card | | 1 | Path | 281 |
| OTN | Svc group | VS Down | Return Path | VS Return Path | | Cluster | | Server |
| CS | CS1 | 308 | 281 | 146 | | 12345 | | 4 |
| CS | CS1 | 307 | 281 | 146 | | 12346 | | 3 |
| CS | CS1 | 274 | 281 | 146 | | 12347 | | 2 |
| CS | CS1 | 273 | 281 | 146 | | 12348 | | 1 |
| Serial | Model | Active | OnPlant | Resp Date | Fail Date | Down Path | Return Path | |
| GI1226TC2417 | DCT5100 TWOWAY | 1 | 1 | 2004/11/05 | 2004/10/12 | 863 | 149 | |
| GI4242ZZ9957 | DCT2000 TWOWAY | 1 | 1 | 2004/11/05 | 2004/10/14 | 863 | 149 | |
| GI1241ZZ4456 | DCT2000 TWOWAY | 0 | 1 | 2003/11/13 | 2004/08/29 | 863 | 78 | |
| GI4135ZZ9942 | DCT2000 TWOWAY | 1 | 1 | 2004/11/05 | 2004/10/22 | 863 | 149 | |
| GI1110ZZ9915 | DCT2000 TWOWAY | 1 | 1 | 2004/11/05 | 2004/09/22 | 863 | 149 | |
| GI1348ZZ0074 | DCT5000 TWOWAY | 1 | 1 | 2004/06/24 | 2004/10/13 | 863 | 149 | |
| GI4406ZZ0021 | DCT2000 TWOWAY | 1 | 1 | 2004/11/05 | 2004/09/17 | 863 | 149 | |
| GI1351ZZ8873 | DCT5000 TWOWAY | 1 | 1 | 2004/11/05 | 2004/10/12 | 863 | 149 | |
| GI4226ZZ1164 | DCT2000 TWOWAY | 1 | 1 | 2004/11/05 | 2004/08/09 | 863 | 149 | |
| GI4413ZZ7798 | DCT2000 TWOWAY | 1 | 1 | 2004/11/05 | 2004/10/19 | 863 | 149 | |
| GI4413ZZ7791 | DCT2000 TWOWAY | 1 | 1 | 2004/11/05 | 2004/06/30 | 863 | 149 | |
| GI4413ZZ5542 | DCT2000 TWOWAY | 1 | 1 | 2004/11/05 | 2004/10/22 | 863 | 149 | |
| GI1401ZZ1234 | DCT5000 TWOWAY | 1 | 1 | 2004/11/05 | 2004/10/24 | 863 | 281 | |
| COUNTERSTRVX (R) STATUS | | | | | | | | |
| WARNING: GI1241ZZ4456 Set-top on account but not active | | | | | | | | |
| WARNING: Upstream path discrepancy between set-tops on account | | | | | | | | |

Figure 15

Consolidated Set-Top Viewer

| Maxxian Test DAC ▼ Select  Make Default | DAC | Toronto | 192.198.6.100 |
|---|---|---|---|

Serial:

| Serial: | 12345678 | From Current | From DAC/DNCS | Search All | Account: |

| Account: | N12345678 | From Current | Search All |

FIGURE 16

| Maxxian Test DAC ▼ Select  Make Default | DAC | Toronto | 192.198.6.100 |
|---|---|---|---|

WARNING: Set-top exists on multiple systems.

Select from:

| Serial | System Name | Location | CA Status | SMS Region | SMS Status |
|---|---|---|---|---|---|
| 1234AB6789 | Maxxian Test DAC | Toronto | 1 | North System | 0 |
| 1234AB6789 | Production DAC System | Sometown, State, USA | 1 | South System | 0 |

FIGURE 17

METHOD AND SYSTEM FOR IDENTIFYING AND CORRECTING LOCATION DISCREPANCIES FOR RECEPTION EQUIPMENT IN A CONTENT DELIVERY NETWORK

CROSS REFERENCE TO RELATED APPELLATIONS

This application is a continuation-in-part of U.S. application Ser. No. 10/964,621, filed Oct. 15, 2004, and this application claims the benefit of U.S. Provisional Application Nos. 60/687,138 and 60/790,711, filed Jun. 3, 2005 and Apr. 10, 2006, respectively. The complete disclosures of all of these references are herein incorporated by reference.

FIELD OF INVENTION

This invention relates generally to identification of discrepancies in location of a receiver or receivers in a content delivery network, and more particularly to the detection and prevention of discrepancies in location for subscriber receiving devices for content and services distributed by way of wired or wireless networks.

BACKGROUND OF THE INVENTION

In a typical distribution system of signals in a content delivery network, such as for cable or satellite television, there are various components that reside on a single physical system or on separate systems linked by one or more communication networks. Such content delivery networks may include content providers which provide content delivered across the network, such as audio, video, data, applications, or combinations thereof.

In a content delivery network, the content is typically provided by content providers into the content delivery network as one or more signals. Such signals are typically encoded to prevent unauthorized access and use of the signal. Receivers, such as digital television receiver units, receive from the network and use such encoded signals for use by users. A receiver typically includes a decode function so that receivers may make use of the encoded signals it receives from the content delivery network. A content delivery network also typically includes a conditional access system connected to the network, which controls the content that any particular receiver may access and use. The conditional access system typically operates in conjunction with the receivers to control the content that any one receiver may access and use. A receiver typically perform checks with the conditional access system to determine the particular content that it is permitted to receive and use, and then decode only such authorized content.

The content delivery network will also typically contain other systems such as subscriber management systems for maintaining and billing customer subscriptions, pay-per-view, video-on-demand, interactive television and other systems which may in turn have records or subsystems used for controlling access to services, features or content, which may be directly or indirectly related to the conditional access system.

Access to various services available on the network is typically controlled through authorizations entered into the subscriber management system. Individual subsystems may in turn have records relating to individual receiver service authorizations. Such records of authorization may in one form or another be duplicated on various systems, and each system may independently exert control over access to the related service or signal.

Receivers may also be in a variety of inventory states for management purposes. Such states may include the receiver being on a valid subscriber account, in inventory, in test mode, or other status known to those of skill in the art. Such inventory states may have service authorizations associated with them, or may be characterized by a lack of authorizations. For example, a receiver in a "test" state would be assumed to have service authorization to allow an operator to verify the functioning of a receiver, and would assume that the receiver is in a location used for testing by the network operation. As another example, a receiver in "stolen", "lost", "defective" or similar status in which it would not be expected to be connected to the network status would be assumed to be in a null set of locations.

A conditional access system or and other systems with service or signal authorization records may not necessarily provide facilities for a large number of content providers to enter authorizations or to manage billing and other customer-oriented functions. Likewise, conditional access systems known in the art may not provide interfaces or functions for the handling of large volumes of transactions except through a connection to a subscriber management system. Where such facilities may be provided within a conditional access system, network operators may not be accustomed to using them, as they may not provide convenient or easily usable interfaces, and they may not include logging and other audit trail mechanisms.

Additional background details regarding content delivery networks, conditional access systems, and technologies deployed therein are described in the following United States patents, which are hereby incorporated by reference:

| | |
|---|---|
| 4,461,032 | to Skerlos |
| 4,510,623 | to Bonneau et al. |
| 5,146,496 | to Westerfer et al. |
| 5,224,161 | to Daniel et al. |
| 5,880,769 | to Nemirofsky et al. |
| 5,970,206 | to Yuen et al. |
| 6,067,440 | to Diefes |
| 5,485,518 | to Hunter et al. |
| 5,828,402 | to Collings |
| 5,438,620 | to Ryan et al. |

Errors in receiver configuration may result in inventory management difficulties and inappropriate usage. A receiver in a "test" status may be considered innocuous. However, if a receiver is in test status with authorization and not located at the network operator's warehouse or other approved test site, then it may have been stolen and inappropriately used. Receivers may be inadvertently defined on multiple systems. At a minimum, this could result in inventory, budget or other accounting error related to the management of receiver expenses. In a more serious vein, a receiver that was stolen from one system could be authorized on another system.

Services to a set of receivers may be advantageously priced because of a common factor usually related to location of the receivers. For example, if a subscriber is paying for services on a first receiver, services for additional receivers in the same home may be discounted or even eliminated. An operator may offer advantageous pricing to a group of receivers in locations such as an apartment building, condominium or other development, and the pricing is only for receivers used within that location. Usage of such a receiver in another location would be considered inappropriate by the operator.

Operational errors, software or hardware problems or other sources of errors may cause discrepancies to occur between subscriber management systems, conditional access systems and other systems such as video-on-demand servers. In such a cases, it may be possible for a receiver to access a service or signal which the network operator does not intend to distribute for that receiver.

There is a need for a system and method for identifying and reconciling differences in indicia of location within various systems to control receiver service access and inventory.

SUMMARY OF THE INVENTION

In accordance with an aspect of the present invention, a method and system are provided to analyse indicia of location for a set of one or more receiver to determine if any receiver in the set is in an inappropriate location. The embodiment may take further steps to confirm whether or not inappropriate usage has occurred. Additionally, whether or not inappropriate usage or an inventory error has occurred, the embodiment may take steps to prevent inappropriate usage from taking place and to correct errors in indicia of location and inventory.

In one embodiment, a receiver's communication path is an indicia of location and is compared to an indicia of location based on a receiver's inventory state. If a receiver's inventory state is associated with one of a set of locations, and the receiver's communication path is associated with a location not associated with the specified inventory state's set of locations, then an error is deemed to have occurred in receiver indicia of location In one embodiment, the indicia of location is the set of communication path for a set of receivers intended to be at a specific location with the same communication path. The communication path for one receiver in the set is compared with the communication paths for the reset of the set of receivers. If there is more than one communication path is in the communication path for the set of receiver, then an error is deemed to have occurred in receiver indicia of location.

In one embodiment, the indicia of location for a set of receivers of being intended to be at a specific location with the same communication path and being identified as located on the same communication path is compared with signal response characteristics such as response time and signal strengths for the set of receivers. If the variance in one or more signal response characteristics is above a specified level between receivers in the set of receivers, then an error is deemed to have occurred in receiver indicia of location.

In one embodiment, the indicia of location for a receiver of having a specified communication path, signal level, or poll response time at a first time is compared to the communication path, signal level or poll response at a second time. If a change or variance occurs above a specified level of the values between the two times, then an error is deemed to have occurred in receiver indicia of location.

In one embodiment, the indicia of location of a receiver being in a specified inventory state at a first time, and where the specified inventory state is intended to be temporary in nature and in which a receiver should not be for longer than a specified time, is compared to a second indicia of location of the receiver being in the specified receiver state at a second time and which is at least the specified time later than the first time. If the receiver has been in the specified state for longer than the specified time, then an error is deemed to have occurred in receiver indicia of location.

In one embodiment, a first indicia of location is the definition of a receiver on a first instance of system such as a conditional access system, subscriber management system, content delivery system or other system which retains information on a receiver is compared to a second indicia of location which is the definition of the same receiver on another instance of the same system type, and where receivers should only be defined on a single instance of such systems. With each system covering different areas, the coverage area of each system is considered an indicia of location covering a distinct area for each system. If the receiver is defined on both the first and the other instance of the system, then an error in receiver location has been identified.

Optional steps may be taking for reporting and displaying the receiver location errors identified and for taking action to correct the receiver location errors.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 15 shows an integrated information display showing information for a receiver from a conditional access system and a billing system with inconsistencies in receiver location identified.

FIG. 16 is an information display for specifying an identifier for a receiver or set of receivers FIG. 17 is an information display identifying a discrepancy of a receiver being defined on multiple systems, and allowing selection of a specific instance of the receiver.

DETAILED DESCRIPTION OF EMBODIMENTS

Figure 1:
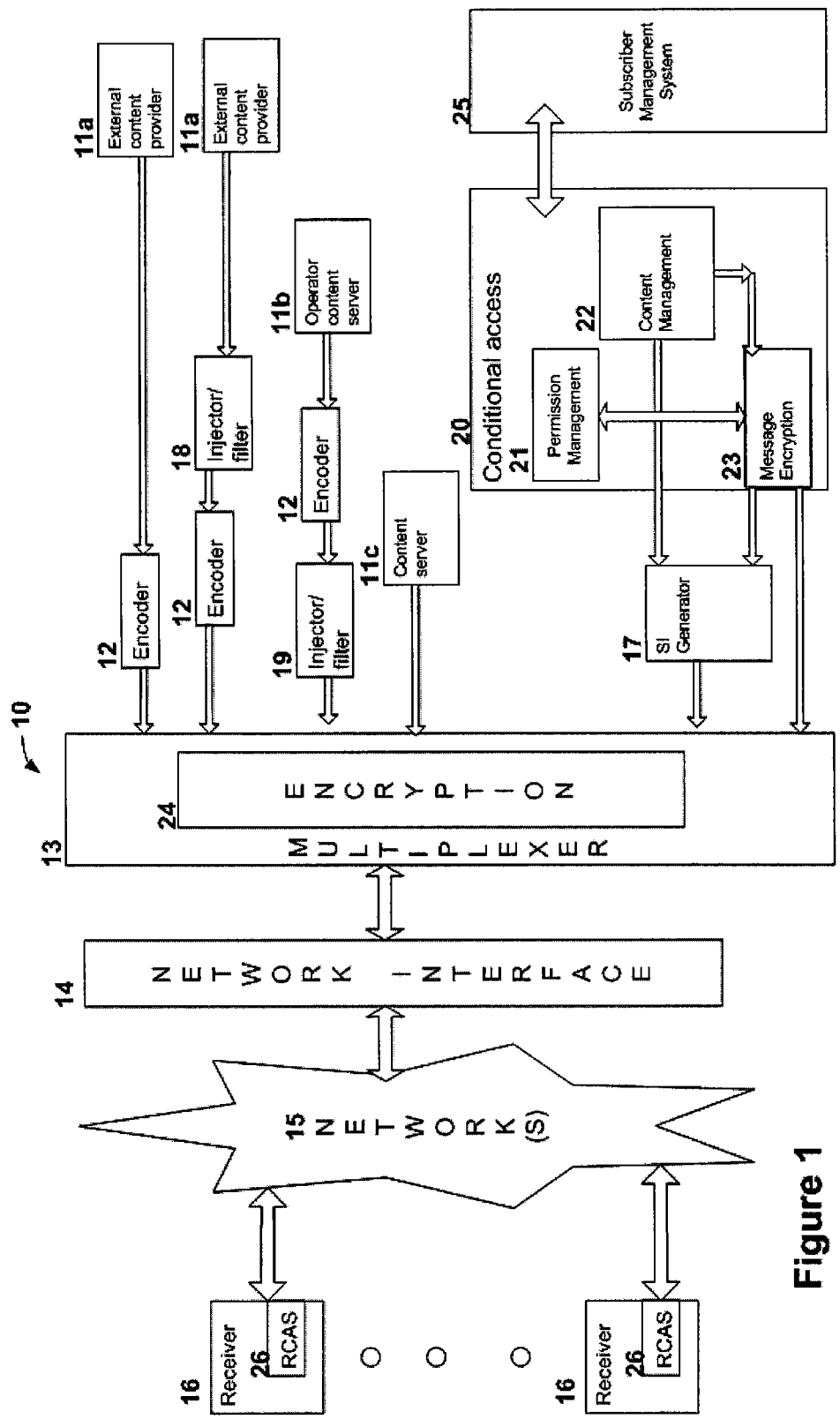
FIG. 1 is a block diagram illustrating functional components of a content delivery network.

The description which follows and the embodiments described herein are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

According to one embodiment of the present invention, there is provided a method and system for detecting location discrepancies for a set of one or more receivers in a wireless or wired signal distribution environment. A method provided by the embodiment may be used to determine whether one or more receivers in the set of receivers may be in an inappropriate location by analyzing different indicia of location for one or more receivers in the set. Additionally, because a receiver being used in a location different from an expected location for the receiver by the operator, the embodiment may take steps to correct the error or to prevent usage of the receiver.

Referring to FIG. 1, a content delivery network 10, such as for digital cable or satellite television, is described. The content delivery network 10 will hereafter be referred to network 10. The following details of the embodiments are mainly focused upon delivery of signals associated with television, but it will be appreciated that other content may be delivered in other embodiments.

Components of the network 10 may reside on a single physical system or on separate systems linked by one or more communication networks. Multiple instances of each component may also be required. Network 10 may include a plurality of content providers 11 for the content being delivered therein, such as external content providers 11*a* and internal content sources 11*b*, which are acquired or stored by the network operator. The content may consist of audio, video, data, applications, or any combination thereof. Depending on conditional access control as described below, the content is made available to receivers 16 in network 10 as determined by an operator of network 10 or by request from a user of receiver 16. The content may be broadcast or transmitted on a point-to-point, point-to-multipoint or other basis as is known in the art.

Examples of content streams include television signals with audio, video, closed captioning and interactive applications that may be embedded into a composite signal, as is the case with a television signal supporting the Wink™ or WebTV™ interactive television specifications. Content streams may also be a series of separate digital transport streams for audio, video, interactive television, and conditional access.

A given instance of content may be shared by one or more services. For example, an English language service may be defined as containing a given video stream and an English-language audio stream. A Spanish service may be defined using the same video stream and a Spanish-language audio stream. In this manner, only the bandwidth of one video stream is used on network 10 while two separate channels may be provided on a program guide.

Content may be received in a format that is compatible with the network 10, or may require processing before transmission within network 10. Examples of processing include compression and encoding for video and audio signals, format conversion, and encryption or the signals. Content may also be available from one or more content servers 11*c* operated by the operator of network 10. Content from content providers 11 may be transmitted in real-time, or slower or faster than real-time for purposes of caching content for deferred viewing at receiver 16 or other downstream device.

Content from content providers 11 may flow into encoders 12 which process the content prior to distribution to a multiplexer 13. Alternatively, for content that is already encoded, it may flow directly into multiplexer 13. Content from multiplexer 13 may then be delivered through a network interface 14 to communication network 15 for delivery to a plurality of receivers 16. The function of multiplexer 13 varies with the network and content type, and format of the content. Examples of multiplexers 13 that may be used include MPEG-2 multiplexers, asynchronous transfer mode (ATM) packet switches, gigabit Ethernet devices, and other similar systems known in the art.

Network 10 may provide multiple facilities for communication between receivers 16 and other components of network 10. As examples, on a cable television network, bandwidth may be allocated separately for content transmission, control signal transmission, and return communication from a receiver 16 with all communication occurring on the same cable. On a satellite television system, the content and control signals are transmitted over the satellite, while receiver 16 may communicate back to components of network 10 through a telephone connection.

Along with content from content providers 11, various forms of data may be transmitted to aid the viewer in the use of a multi-channel, multi-service system. This type of information, which can include the electronic program guide and related tables for access, frequency and other information for receiving and describing the signal, are referred to as service information (SI) tables. SI tables may be produced and transmitted by SI generator 17, and may also include various forms of control information from external sources to control access for content such as subscription services and pay-per-view movies, and other forms of information the content of which may be used by receiver 16. Signal enhancements such as station logos, data, and other forms of content may be included with the content from the various sources, may be added to or removed from signal associated with the content by injector/filter 19 that may be performed before or after the encoding process. As an example, injector/filter 19 is shown in FIG. 1 as performing signal enhancements after the encoding process of content from operator content server 11*b*.

Security, authorization and configuration of receiver 16 to use signals in network 10 may be provided by a conditional access system 20 (CA). CA 20 controls which content a particular receiver 16 is authorized to access. Services and functions provided by CA 20 include, among other things, permission management 21 for control of authorizations of a per user or receiver basis, content management 22 for controlling access to content, message encryption 23 facility to secure the communication authorization and other messages for transmission. CA 20 operates in conjunction with content encoder 12 for protecting of the content during transmission from unauthorized access, and a receiver conditional access system 26 (RCAS) at receivers 16 for communication with CA 20. RCAS 26 may include local secure storage of permissions and other content access information. Content encoder 12 may perform various transformations on all or part of the content signal to prevent unauthorized access, including signal modification, encryption, and other methods as is known in the art.

Subscription control of CA 20 may be managed by entering service authorization and cancellation commands on a subscriber management system (SMS) 25. SMS 25 forwards subscription control requests to CA 20, which may then generate the appropriate commands and operations to deliver subscription control commands in the form and manner required to be accepted by a receiver 16.

CA 20 systems may also manage communication with a receiver 16. Communication may be divided into separate communication paths 70 to a receiver and from a receiver, also referred to as upstream and downstream communication paths 70.

With respect to communication network 15, for a typical cable television system, communication network 15 may be a system of amplifiers, transmitters, re-transmitters, copper cable, fiber optic systems, switches and routers used for distribution of a signal in communication network 15, as is known in the art. In a cable television network, receivers 16 are connected to communication network 15 and may communicate back with an operator of communication network 15 using Internet, DAVIC (Digital Audio Video Council, Geneva, Switzerland), other command protocols supported by the communication network 15, or a combination of such protocols.

Other examples of communication network 15 include DTH (direct to home) satellite, microwave multichannel multipoint distribution service (MMDS), local multipoint distribution system (LMDS) television distribution system, DSL (Digital Subscriber Loop) and its various high-speed variants such as VDSL (as used, for example, by telephone companies for high-speed data and video transmission), ATM (Asynchronous Transfer Mode) networks, cellular telephone and other communication networks for transferring data as is known in the art.

Figure 2:
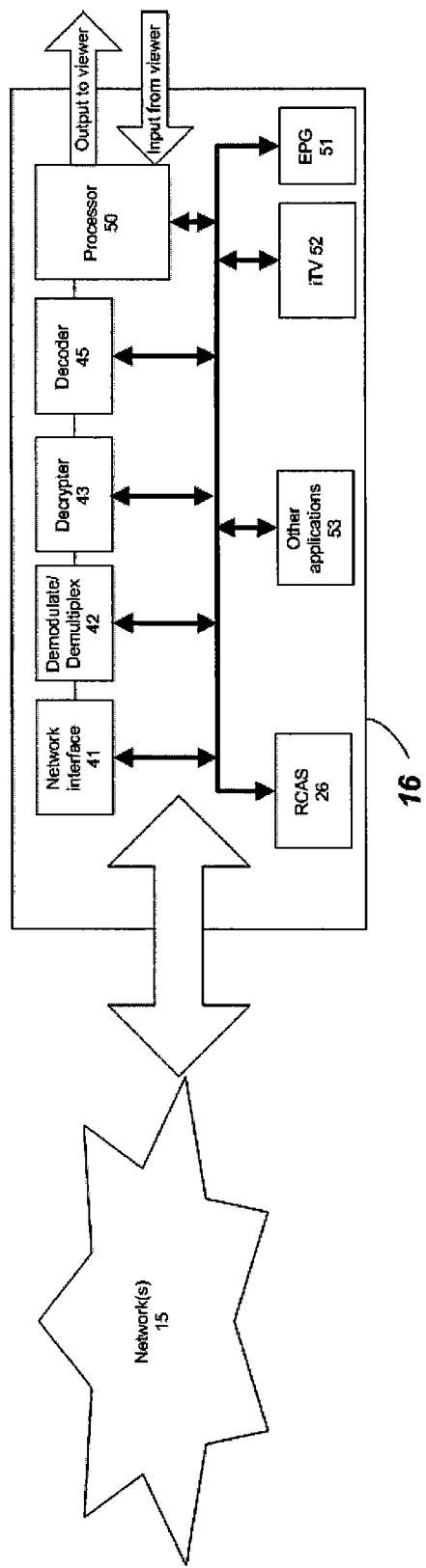
FIG. 2 illustrates the functional components of a receiver of the network of FIG. 1.

Referring to FIG. 2, some of the functional components of receiver 16 that may be found in typical digital television applications on network 10 are shown. Components of receiver 16 may be implemented in hardware or software, and individual or groups of functions may be provided by separate applications communicating through an operating system or other shared facility, or may be part of a single application, as is known in the art.

Receiver 16 includes one or more network interfaces 41 for communication to and from communication network 15. In an embodiment for a television receiver, network interfaces 41 may consist of one or more tuners to receive a signal from communication network 15, and a modulator or a telephone modem for returning data to communication network 15. Receiver 16 may further include demodulate/demultiplex function 42 to convert modulated signals received from network 15 into digital data, and extract the desired data from the signal stream. A decrypter function 43 performs decryption functions on the signals, and is typically controlled by RCAS 26 for controlling unauthorized use and access. The decryption of decrypter function 43 may be based on analog or digital means of preventing unauthorized access to the signal.

Within receiver 16, decoder 45 transforms the signal's decrypted bits into a content format required by a user to receiver 16, such as a television viewer. For example, decoder 45 may convert the bits from MPEG digital audio and video bit streams into analog television signals.

RCAS 26 may typically be included in receiver 16 which controls the content that may be accessed and used at receiver 16. Examples of control mechanisms include channel subscription authorizations received from CA 20, and pay-per-view purchases made at receiver 16. In some embodiments, RCAS 26 can determine whether access is allowed through its own locally stored parameters, or by making an authorization check with CA 20. RCAS 26 may also provide additional functions for implementing or controlling the decryption process by decrypter 43 such as controlling the reception and processing of data, or providing decryption keys or other information required for controlling the decryption or access processes at receiver 16.

One or more processors 50 may be used to implement the functions of receiver 16 or to provide or control communication between the various functions of receiver 16. The functions and facilities of receiver 16 may further be controlled by an operating system and one or more software modules that executes on the one or more processors 50.

Other functions that may be available on receiver 16 can include an electronic program guide (EPG) 51 to allow a user to list, select and obtain other information on the content available; an interactive television (iTV) subsystem 52 to provide facilities for executing other applications such as games, viewer response gathering and other functions. These iTV applications may operate in conjunction with television programs received at receiver 16, or independently as separate services. System applications 53 include system configuration, audience measurement, advertising management delivery and others functionality. Advertising management systems may include systems for presenting or substituting advertisements, and presenting advertisements in a targeted manner based on viewing habits, user demographics or other criteria. Advertising management system may also include the ability to capture usage data such as time and date of channel viewing. Applications such as EPG 51 and the other applications may in turn be iTV applications that use the facilities of iTV subsystem 52. In the embodiment, system applications 53 may also include capabilities for exercising some control over what may be viewed through receiver 16, such as parental control and copy protection. These applications may in turn require additional processing of an accessed signal by network components that may be implemented in one or more of the injector/filters 18 or 19, content spooler 11*c*, CA 20, SI Generator 17, or component, data or other signal information.

Multiple instances of each functional component may be available on a particular receiver 16. Thusly, simultaneous processing of multiple signals is possible, and the ability to handle different signal types is also provided. Examples include the ability to process multiple television signals at a time for picture-in-picture functions, to record one program while watching another on a receiver equipped with a personal video recorder (PVR) feature, and to receive analog and digital signals.

Functions and applications may be provided and managed in multiple ways on receiver 16. The applications may be part of the software provided with receiver 16, and included with receiver 16 when it is shipped to a user or updated software thereon after the user has put receiver 16 in use. Additionally, one or more separate binary applications may be transmitted separately to receiver 16 through communication network 15.

Further, interpreted applications may be executed within an iTV environment. The iTV applications may be considered separate content provided in network 10, or may be included with video or other content as optional enhancements. Transmission of an application may be managed as a separate content stream or as a component of another content instance such as video program.

In alternate embodiments, receivers 16 may include any and all of the following operating alone or in combination: digital set-top cable and satellite receivers; integrated components within digital televisions; personal computers with appropriate network connections; cellular telephones and personal digital assistants (PDAs) connected through wireless networks, or computer network hook-ups; and gaming consoles. Such receivers 16 typically rely on CA 20 having one or more capabilities similar to those used in television transmission, including satellite and other digital radio systems, mobile telephones using chip-card technology, and mobile or home devices and related services for receiving music, video or other content that receive content either directly from a network or indirectly through a computer such as the iPod™ music player and iTunes™ music service.

Receivers 16 may have the ability to receive software updates and applications through communication network 15. In television and other receivers, these applications do not necessarily require interaction with the user, as they may execute in the background without the user's knowledge or during the receiver off state.

Receivers 16 may also include one or more application execution environment to receive and execute scripts or compiled or interpreted applications. Examples include various Java™ systems such as Personal Java™, Java TV™ and others, as implemented in computers, web browsers and other devices. For embodiments receiving television signals, application execution environments of receiver 16 include iTV products and specifications such as WebTV™ and MSN™TV services, the Wink™ and OpenTV™ systems, and specifications such as DVB-MHP from the DVB Project, and OCAP (Open Cable Application Platform) from the Society of Cable Telecommunications Engineers (SCTE), and others. Other applications, such as an EPG, an audience measurement application, an advertising management system, or others may be implemented as applications within an application execution environment, or may include an application execution environment which may provide similar capabilities to an iTV system for running interactive or background applications. Additional systems with similar capabilities for receiver 16 are known in the art.

Figure 2A:
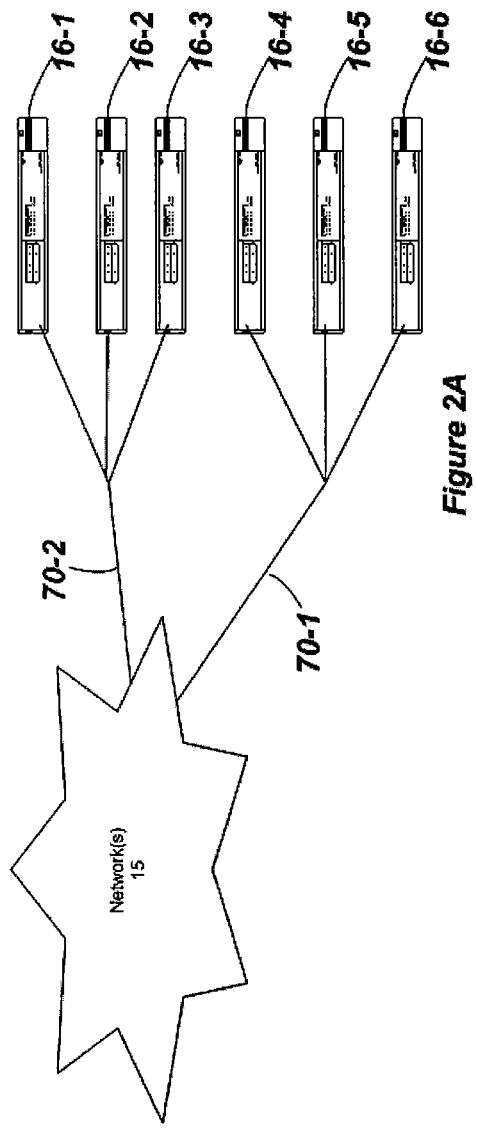
FIG. 2A illustrates the communication paths between receivers and the network of FIG. 1.

FIG. 2A illustrates the communication paths 70 which may exist between a network 15 and receivers 16. In this illustration, receivers 16-1 through 16-3 share a common communication path 70-1, and receivers 16-4 through 16-6 share a common communication path 70-2. Such a communication path 70 may be wired or wireless. In a wireless configuration, the path may consist of the transmitter/receiver combination used to communicate with the receiver, such as a cellular telephony tower. Because a communication path 70 is typically tied to a limited geographical area, a communication path 70 can be used as an indicator of location for a receiver 16. Furthermore, for receivers on a given communication path 70, signal characteristics of the communication between the receiver and the network such as the strength of the signal coming from the receiver 16 and the response time from the receiver 16 for a signal sent to the receiver 16 such as, for example, a ping command, can be used as indications of location within a given communication path 70. For example, the longer the communication path 70 between the receiver 16 and the system sending the ping, the weaker the receiver 16's response signal strength will be and the longer the receiver 16's signal response time will be.

In an embodiment for distribution of television signals in network 10, whether using analog, digital or a combination of both technologies, network 10 and receiver 16 typically rely on the encryption and access control components provided in network 10 and CA 20. Such components control receivers 16 that have access to particular content and signals in network 10, whether in the form of specific viewing channels, program selections, or other features available to the subscriber such as interactive applications. Examples of these security systems that may be implemented include the Simulcrypt specifications developed by the DVB Project, Geneva, Switzerland, conditional access systems and smart cards from Nagravision SA, Cheseaux, Switzerland, and NDS Group plc, Middlesex, UK, and the conditional access subsystems of the DigiCipher™ II products from Motorola, Inc., Schaumburg, Ill., and the PowerVu™ products from Scientific-Atlanta, Inc. Lawrenceville, Ga. Other systems for controlling or facilitating access have been implemented, which systems include applications for parental control methods such as the V-Chip technology offered by Tri-Vision International LTD, Toronto, Canada, the electronic program guide (EPG) products offered by Gemstar-TV Guide International, Inc., Los Angeles, Calif., and video copy protection products from Macrovision Corporation, Santa Clara, Calif.

As previously described, security and authentication of access may be provided by CA 20 and other components at the site of the operator of network 10 (such as encoders 12) and within receivers 16, as described above with reference to FIGS. 1 and 2.

CA 20 communicates authorizations to access and use signals to RCAS 26 located on each receiver 16. Receiver 16, RCAS 2, or a component or subsystem peripheral to RCAS 26 such as a smart card, typically has one or more identifiers. These identifiers, alone or in combination, may identify receiver 16 in network 10, and may be used by CA 20 or other systems to communicate with and send authorization commands to RCAS 26 or other components or subsystems of receiver 16. These authorizations are typically based on transmitting one or more authorizations periodically to a receiver 16; upon receiver 16 requesting a list of authorized services from CA 20; or, for services such as pay-per-view movies, on a credit scheme where the credit is transmitted to or provided with receiver 16 and the credit is reduced through usage of pay-per-view content at receiver 16. In a credit scheme, the credit may be based on a financial amount (dollars), a number of tokens or other methods that are known in the art. The credit may be provided by SMS 25 that may be separately accessed by a user of receiver 16 (such as by telephone orders to SMS 25). In such an embodiment, the authorization request and related credit information to is provided by SMS 25 to CA 20 for processing and transmission to receiver 16. Examples of SMS 25 include systems such as those provided by DST Innovis, Inc., El Dorado Hills, Calif., CSG Systems, Incorporated, Englewood, Colo., and others.

Content servers 11*a*, 11*b* and 11*c* (referred to hereafter generally as content server 11, or CS 11) may include servers for video-on-demand (VOD), pay-per-view (PPV), impulse pay-per-view (IPPV), applications such as interactive television (iTV), or other forms of content, software or services. Authorization for use of these services is typically enabled through SMS 25, with actual control of the services handled either directly by the server or a related server access control component, or through a system providing access control services such as CA 20. For example, SMS 25 may pass VOD authorization commands for specific receivers 16 to CA 20. CA 20 may then in turn forward authorization messages to a VOD server, or may periodically pass a full list of authorized receivers 16 to a VOD server. Other methods for managing and propagating authorizations will be known to those of skill in the art.

An authorization sequence for service access in television distribution systems as described above is typically based on an operator's entry of the authorization to an SMS 25. The SMS 25 then generates one or more commands which are sent from the SMS 25 to the CA 20 system or other CS 11, based on an agreed protocol and a set of commands between SMS 25 and CA 20 or CS 11. The CA 20 or CS 11 may in turn use the commands from SMS 25 to generate one or more commands and send them to the RCAS 26 or other component or subsystem in receiver 16, or to another component that has a measure of control over service usage such as a CS 11 or subsystem thereof. The communication and format of commands between instances of CA 20, CS 11, RCAS 26 or other receiver components typically differs from the format and protocol of commands sent between the SMS 25 and the CA 20 or CS 11.

This process can result in multiple separate contexts for the characteristics of a receiver 16, including:
- the records that may stored within the SMS 25
- the records that may stored within the CA 20
- the records that may stored within the RCAS 26 of the receiver 16
- the records that may be stored within other components or subsystems of the receiver 16, such as an EPG or VOD component
- the records that may be stored within various instances or subsystems of CS 11.

Inconsistencies may develop between these multiple contexts, wherein the information on a receiver may not be synchronized among the SMS 25, CA 20, CS 11, RCAS 26 and other receiver subsystems, or a change in characteristics such as those related to authorization or location on one system may not be reflected on another system.

Detection of errors in receiver 16 information is often rendered difficult, as a compromised receiver 16 may in itself appear to be properly configured, but a specific indicia of location may be related to an inventory state such as a test status in which receiver 16 is expected to be at a specific location, such as a warehouse of the operator. A set of receivers may be configured and expected to be in a specific location such as a home, but one or more of these receivers may have been moved to a different home. Receivers may have deliberately or inadvertently migrated between different networks of the same or multiple operators, resulting in inventory errors and problems in inventory and cost management. Functions simply may not be available for a receiver 16, SMS 25, CA 20 or CS 11 system to identify, report on or take action on these discrepancies.

System operators typically tend to not have means to practically remedy this problem because:
- CA 20, SMS 25 and CS 11 systems may not have the capability to reconcile discrepancies in information for a receiver 16 or with each other, or may have deficiencies in their reconciliation systems;
- CA 20 and CS 11 systems may not have interfaces or automated systems in place to allow either manual or automated reconciliation of receiver 16 information and configuration;
- CA 20 and CS11 systems may not have knowledge of operational statuses of receivers such as test states, or relationships between receivers such as receivers being on the same account or in the same geographical area
- CA20, CS11 and SMS25 system may not retain historical information on receiver inventory and configuration, such as signal response level, response time, and inventory states
- Information between multiple CA20 systems, CS11 systems and SMS25 systems may not be compared and correlated for duplicate entries with respect to each system. As an example, a receiver may be erroneously defined on two or more CA20 or SMS25 systems.
- Reconciling receivers 16 on a manual basis from SMS 25 may result in significant operator costs. Usage of SMS 25 systems may result in separate charges from the vendor of SMS 25 for account creation to access the receivers 16 and for each transaction sent to receiver 16;
- Manual entry is prone to errors, which could result in unintended disabling of in-service receivers 16;
- The inconsistencies in the indicia of location may be the result of improper or unauthorized use of the SMS 25, CA 20 or CS 11 systems, in which case manual use of either system could result in detection and disruption or circumvention of the corrective measures being applied.

A method and system are provided for identifying and correcting inconsistencies in receiver indicia of location, and, optionally, where location errors are identified taking measures to prevent the usage of the receiver or correct the receiver information.

Figure 3:
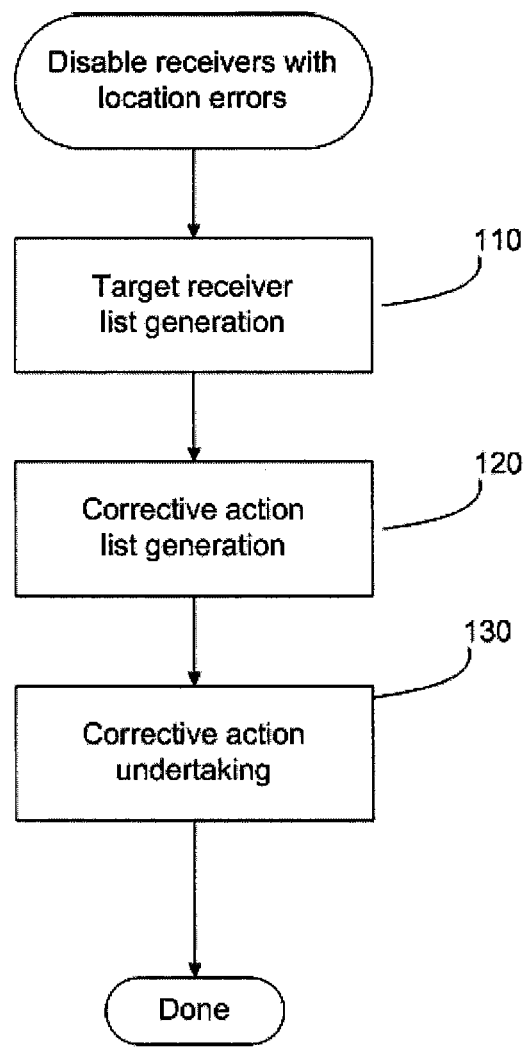
FIG. 3 is a flow diagram of a method of the steps for identifying and correcting potential location errors for receivers in the network of FIG. 1.

Referring to FIG. 3, a flow-chart of steps an method of the embodiment of the method for identifying and correcting errors in receiver indicia of location in network 10 is shown. Briefly, the steps of the method include target receiver list generation 110, corrective action list generation 120, and corrective action undertaking 130. These steps are elaborated later in this document.

Figure 4:
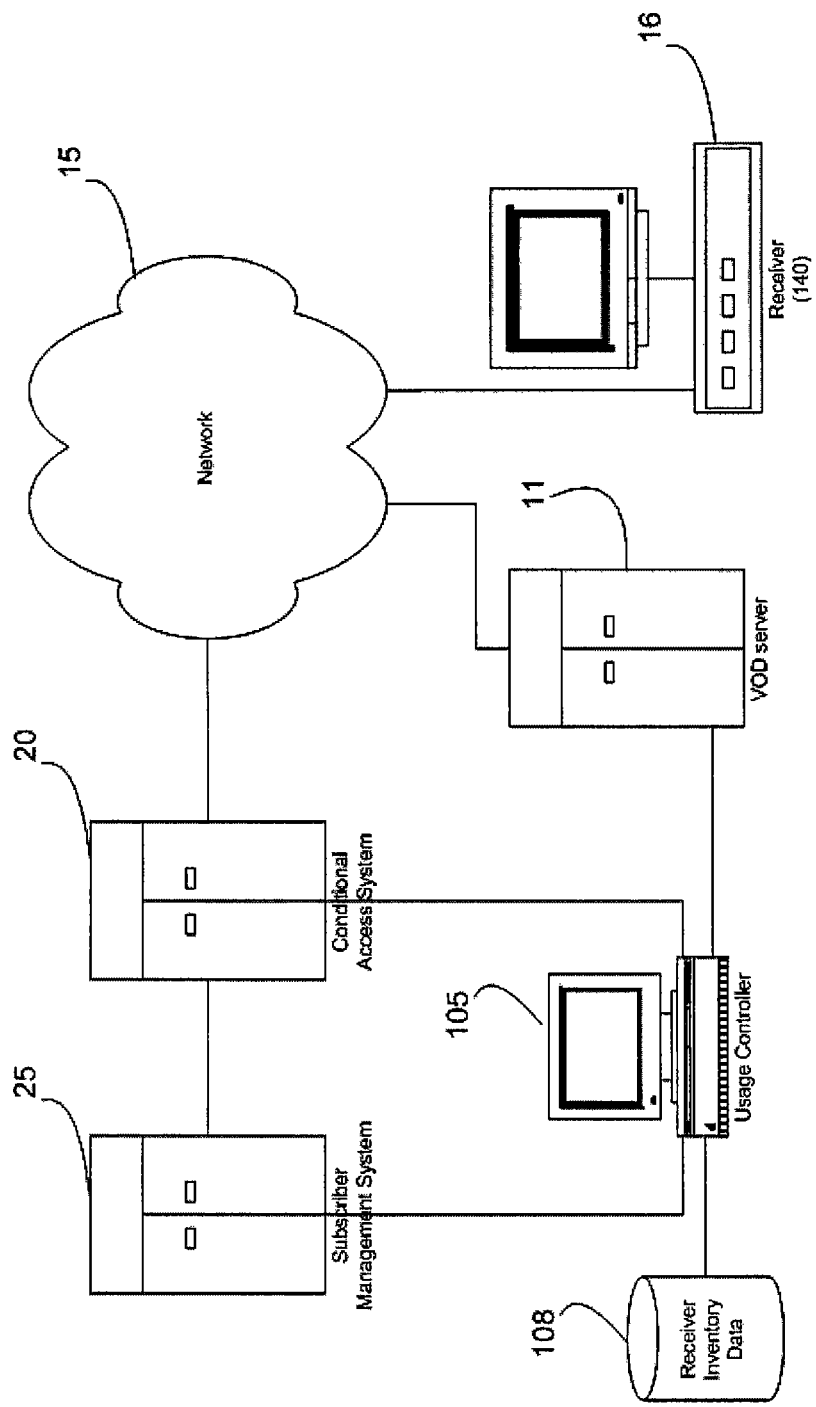
FIG. 4 is a block diagram of network components of a system for identifying and correcting potential receiver location errors in the network of FIG. 1.

FIG. 4 illustrates in a block diagram the functional components of a system implementing an embodiment of the invention. An access and reporting system 105, referred to herein as ACRS 105, implements the method detects potential inconsistencies in receiver indicia of location for a receiver 16 by way of comparing indicia of location of the receiver 16 as available from one or more of CA system 20, SMS system 25, another server such as a VOD server shown in the diagram as a content server CS 11, other sources such as data source 108, or combinations thereof. The indicia of location may be obtained by an ACRS 105 from any one of or combinations of the various sources. Detail of possible implementations of ACRS 105 are elaborated later in this document.

Furthermore, within the network of FIG. 4, multiple instances of each of CA system 20, SMS system 25 and content server CS 11 may exist and be accessed by one or more ACRS 105.

Methods of the Invention

In an embodiment, indicia of location include one or more indicators relating to communication with a receiver 16 that is intended for receiving signals in network 10. An indicator relating to communication may be, for example, the identification of a communication path 70 to or from receiver 16 on network 10, or data related to the communication such as a signal strength indicator or a response time to a poll such as a ping command, or evidence that receiver 16 is defined on network 10 within a system such as CA 20, SMS 25 or CS11. As examples, a communication path 70 between a receiver 16 and network 10 may specifically be related to the communication between the receiver 16 and CA 20 or receiver 16 and CS11.

Indicia of location may also include an indicator relating to an inventory state for a receiver 16 on network 10. A service state may be, for example, an indicator from SMS 25 that a receiver 16 may be able to receive services, but in a test or other state in which a receiver is expected to be in a specific location such as a warehouse used by the operator for receiver testing purposes. Other such states may exist where a receiver 16 is able to receive services but not on a subscriber account, and in which state a receiver 16 is not expected to be active for more than a specified amount of time. For example, a receiver may not be expected to be in test state for more than a specified number of days. As another example, a receiver may be in an inventory state specific to pre-installation, where the receiver 16 can be providing services immediately when received by a subscriber, but such pre-installation should be superseded by placing the receiver in a different inventory state such as an indication that the receiver is on an account for the subscriber within a specified amount of time.

Indicia of location may be expected to be common for a specified set of receivers 16. For example, a receiver 16 may be tied to an account, and on this account, other receivers 16 are also configured. Another indicia of location relating a receiver to other receivers 16 may be an indicator of location such as an address, postal code such as a ZIP or ZIP+4 code or other indicator of location.

Figure 5A:
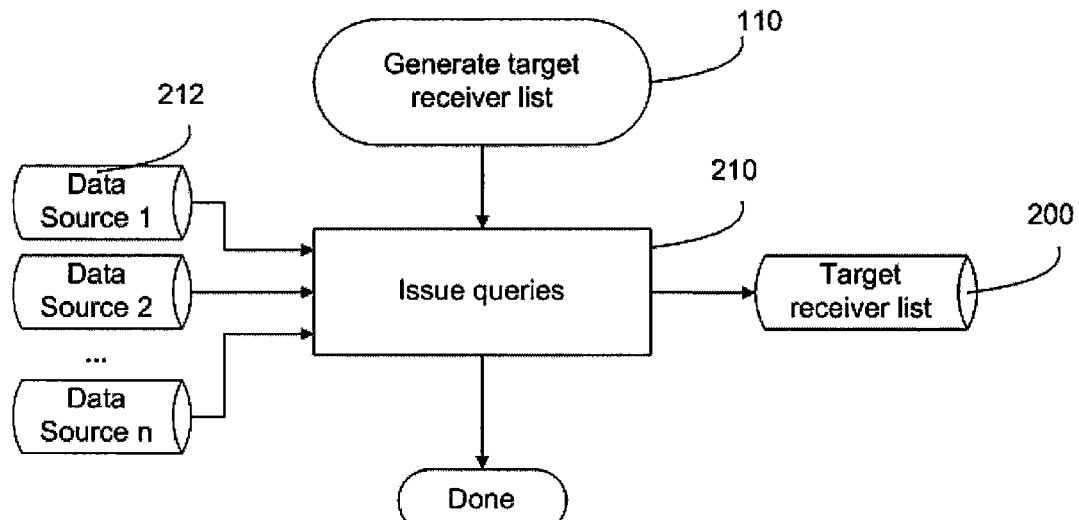
FIG. 5A is a flow diagram for directly generating a target receiver list for the method of FIG. 3.
Figure 5B:
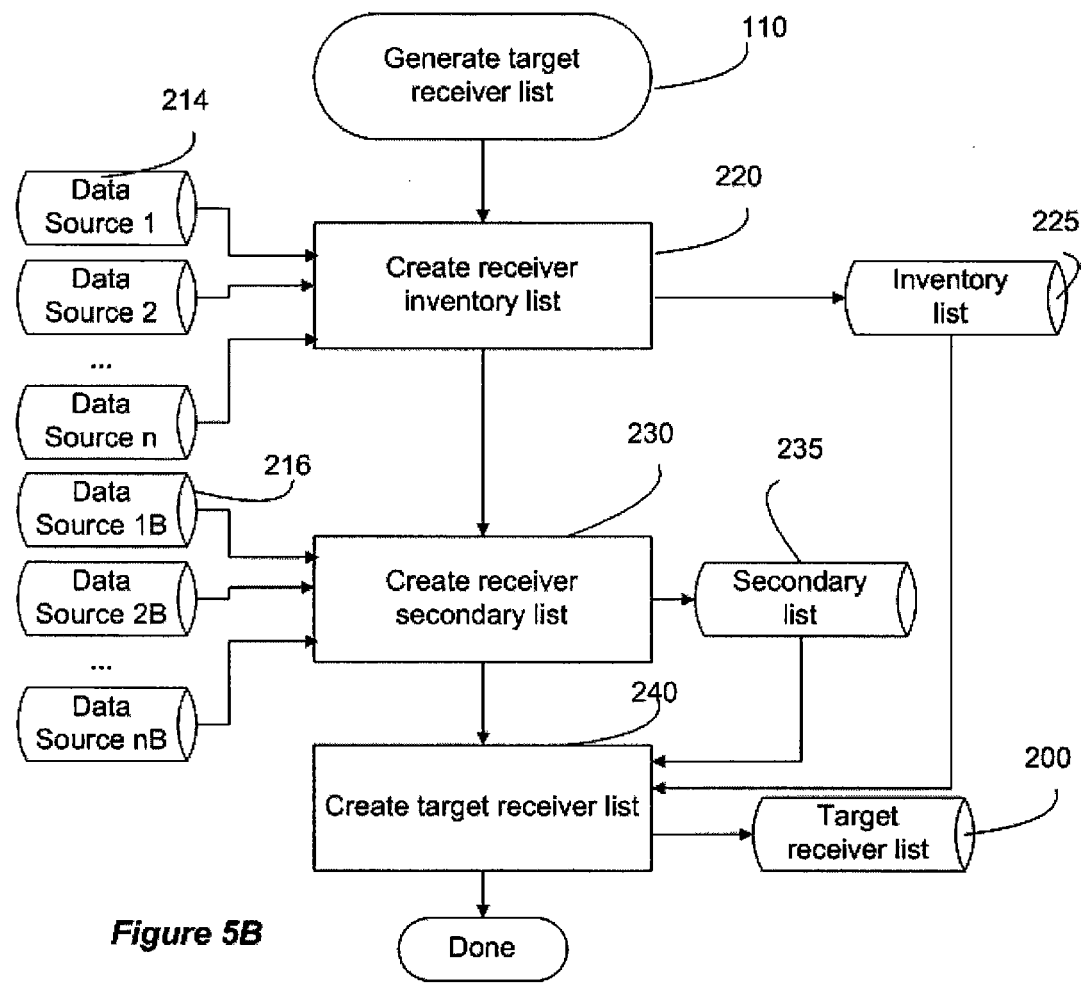
FIG. 5B is a flow diagram for generating a target receiver list for the method of FIG. 3 based on generating an inventory list and an secondary list.

Referring to FIGS. 5A and 5B, flow-charts are shown to elaborate step 110 of FIG. 3 for the generation of a target receiver list 200. Briefly, the steps of the method include the acquisition of two or more indicia of location from a variety of data sources, and comparing the values of the indicia of location to one or more expected combinations of indicia of location to determine if inconsistent settings of indicia of location may exist for the receiver 16 or for a set of receivers 16. In an embodiment, it is determined whether a indicia of location, such as relating to an indicator relating to receiver location, is inconsistent with another indicia of location, such as relating to an indicator relating to an inventory state which would imply one of a set of one or more specific locations for receiver 16. From the determination, it can be ascertained whether a receiver 16 has an inconsistency in its indicia of location.

FIG. 5A shows a variety of data sources 212 from which receiver and respective indicia of location associated with receiver 16 can be obtained. In step 210, one or more queries are issued against data sources 212 to directly generate target receiver list 200.

The information required for obtaining and creating target receiver list 200 may be available in a single system, or through a system which can access multiple systems as if these were a single system. In such a case, a single query can be designed to directly create target list 200 by applying one or more search criteria within a query against one or more data sources. In such a case, an embodiment may generate target receiver list 200 by examining if a particular receiver 16 has two or more indicia of location associated with it which, in combination, are not consistent with the receiver 16 being properly configured in network 10.

The generation of the target receiver list 200 may include an additional step separate step of identifying a specific receiver 16 or set of receivers 16. As an example, the generation of target receiver list 200 may be based on entry by an operator of an identifier for a receiver such as a serial number, or an identifier associated with a receiver can be entered such as an account number, address, telephone number, ZIP code or other information. Such an identifier is then used by step 200 to create a target list of receivers. In such a manner, the method can quickly be executed for analysing a single receiver, account or other set of receivers.

Path and Inventory State Inconsistency

In one embodiment, CA system 20 is a source of data 212. Within a CA system 20, a receiver 16 may also have information related to the communication path 70 of a receiver 16, and a set of one or more communication paths 70 is known to be used by receivers 16 in a set of one or more warehouses. An SMS 25 has information identifying receivers 16 which are in test state and expected to be located at a warehouse. The indicia of location are therefore whether or not a given receiver 16 is in test state on SMS 25, and whether or not given receiver 16 is known by CA 20 to be on a communication path 70 associated with a test warehouse. In the following example where the information of receiver 16 is in table receiver_table, receivers 16 are identified by a field receiver_id, a receiver's state is set in column receiver_state:

```
SELECT receiver_id FROM receiver_table
    WHERE receiver_state = "TEST"
```

Taking the example further, the receiver_id and receiver_state fields may be in separate tables on separate databases, respectively identified in the following example as tables receivers_table and receiver_state_table. These table names could represent database and table combinations, views on tables or database, or other mechanisms as would be known to those of skill in the art. The tables may be respectively located on the SMS 25 and CA 20. The controller may contain one or more database or data access tools that allow data sources from multiple systems to be usable from a query operation. An SQL query against these multiple tables could take a form such as:

```
SELECT receiver_id FROM receivers, receiver_state_table
    WHERE receivers.receiver_id = receiver_state_table.receiver_id
    AND receiver_state_table.receiver_state = "TEST"
```

In other cases, multiple queries, a hierarchy of queries or single queries with multiple selection criteria may be required from one or more sources to create the target list 200. Additional data and query structures or fields may be used to map the receiver_id fields from the tables, as known to those of skill in the art.

FIG. 5B illustrates an alternate embodiment where the data is acquired in separate steps. Operational rules or preferences, technical capabilities, physical access restrictions, jurisdictional regulations or other encumbrances may prevent a single process or system from accessing multiple sources of receiver indicia of location, or from accessing multiple indicia of location in a single step from one or more sources. In such a case, multiple steps may be required to obtain the required receiver indicia of location and generating target list 200, as exemplified in FIG. 5B.

In FIG. 5B, step 220 creates a first list of receivers 16 based on a first query consisting of one or more queries or other data acquisition methods from one or more systems, databases or other data sources 214 containing information on receivers 16. Such data may be used as evidence of one or more indicia of location. The first query may be designed to obtain information on all receivers 16, or on all receivers 16 which may have one or more specific indicia of location, or which are associated with one or more identifiers entered as part of step 110. The first list is referred to herein as inventory list 225.

Step 230 then creates a second list of receivers 16 based on a second query consisting of one or more queries or other data acquisition methods, and the second query may be issued against the same data sources as the first query, other data sources, or combinations thereof. Such data may be used as evidence of one or more second indicia of location. The second query is designed to obtain information on all receivers 16 that are known to have one or more second indicia of location. The second list is referred to herein as secondary list 235.

Step 240 then creates a target receiver list 200, which is a third list consisting of information on receivers 16 that are in inventory list 225 but that are not in secondary list 235. Target list 200 is therefore a list of receivers 16 that have a combination of indicia of location that are deemed inconsistent.

While FIG. 5B shows the sources of data 214 and 216 as separate for steps 220 and 230, any or all of data sources 216 could be the same as any or all of data sources 214, and may in fact be a single source.

In the embodiments described above, CA 20 and SMS 25 were identified as potential sources of data. Other sources of data 212, 214 and 216 for receiver indicia of location may include inventory state, service usage records, communication records or combinations thereof, such as but not limited to:

- pay-per-view (PPV) and impulse pay-per-view (IPPV) systems;
- video-on-demand (VOD) systems;
- interactive television (iTV) systems which may have records of iTV application usage at the receiver 16;
- inventory and management systems for controlling receiver 16 distribution;
- shipping and purchasing records and other data sources for receivers 16;
- records of communication with or data obtained from receivers 16, including usage information viewing records, state information, or combinations thereof. Other sources of receiver 16 information, state and activity will be apparent to those of skill in the art. In other embodiments, other systems with data accessible to the operator of network 10 may be used to obtain records of communication with receivers 16. These include audience measurement systems, targeted advertising systems, and electronic or interactive program guides; and
- systems or records for managing network components which may control or indicate access to receiver 16, such as tap, network or other connection management systems, as used on cable system to enable or disable the physical connection of the cable to a given household.

It will be appreciated that other sources of receiver indicia of location may also be used.

Historical Data as Source

Multiple instances of data taken at different times from one or more of the preceding sources may be used. As an example, data from a CA 20 may be extracted at one point in time, and extracted again at another point in time. Two or more extracts taken at different times from the same source may be considered different data sources for the purposes of description of the invention herein.

Multiple Instances of Receiver

Multiple instances of the same type of source system or of the same type of source system may be used. For example, an operator may have sufficient receivers 16 to require multiple CA 20 systems, and multiple physical or logical SMS 25 systems. The multiple instances of CA 20 systems or SMS 25 systems may be of different types. Two or more instances of the same source system type may be considered different data sources for the purposes of description of the invention herein The generation of target list 200 may be based on a variety of indicia of location. The selection of indicia of location may be based on hypothetical or verified inconsistencies in values or settings of indicia of location for receivers 16. Variances may occur because of operational errors, system failures and other causes. Combinations of indicia of location may be selected based on identifying areas where different systems may allow access to one or more features, even though another system may indicate that access to the same one or more features is forbidden.

In different embodiments, combinations of receiver indicia of location may include:

- Indication of activation or usage of a receiver 16 from any system described above when the receiver 16 is not identified within SMS 25, CA 20, inventory or other records as a receiver 16 that is associated with network 10;
- Indication of PPV or IPPV activity or configuration on a receiver 16 within one or more PPV, IPPV, CA 20 or SMS 25 or other system when PPV or IPPV activity is not appropriate to the inventory status on the receiver 16 or receiver 16 is not defined.

Queries for receiver indicia of location may include one or more identifiers used to identify a particular receiver 16. For operational, security or other reasons, the identifier for a receiver 16 as used in SMS 25 may be different from the identifier used for CA system 20 or other system such as an IPPV system to communicate with the receiver 16. Within FIG. 5B, steps 220, 230 or 240 could be accessing sources of data to match two or more receiver identifiers to ensure that step 240 has the appropriate identifier within the target receiver list 200.

Different Signal Response on Same Return Path Location

In one embodiment, an indicia of location of a set of receivers 16 is that they share they share the same indicator of location, and a second indicia of location of a set of receivers 16 is that, given that they are within the same location, they should be on the same communication path 70.

As an example, the following pseudo code can be used to generate the target list:

```
FOR ALL ACCOUNTS:
    GET RECEIVERS ON ACCOUNT FROM SMS 25
    IF MULTIPLE RECEIVERS ON ACCOUNT:
        GET PATHS FOR RECEIVERS FROM CA 20
        GET FIRST RECEIVER PATH
        FOR OTHER RECEIVERS ON ACCOUNT:
            IF OTHER_RECEIVER_PATH <> FIRST RECEIVER
            PATH
                PATH_INCONSISTENCY = TRUE
IF PATH INCONSISTENCY = TRUE
    PUT ALL RECEIVERS ON ACCOUNT ON TARGET LIST
```

As a further example, if a specific receiver is identified in step 110 as a target for execution of the method, the following algorithm would implement the generation of the target list based on examination of the indicia of location or the receivers on the same account:

```
GET ACCOUNT FOR ENTERED RECEIVER
    GET RECEIVERS ON ACCOUNT FROM SMS 25
```

```
IF MULTIPLE RECEIVERS ON ACCOUNT:
    GET PATHS FOR RECEIVERS FROM CA 20
    GET FIRST RECEIVER PATH
    FOR OTHER RECEIVERS ON ACCOUNT:
        IF OTHER_RECEIVER_PATH <> FIRST RECEIVER
        PATH
            PATH_INCONSISTENCY = TRUE
IF PATH INCONSISTENCY = TRUE
    PUT ALL RECEIVERS ON ACCOUNT ON TARGET LIST
```

Different Return Path, Same Indicia of Location

In one embodiment, a indicia of location of a set of receivers 16 is that they share they share the same indicator of location, and a second indicia of location of a set of receivers 16 is that, given that they are within the same location and on the same communication path 70, the response characteristics of the receivers 16 on the same communication path 70 should be similar.

The range of expected signal level and poll response time may vary from receiver model to receiver model. For example, a newer model Y receiver may have a faster processor and improved transmitter over an earlier model X receiver.

The acceptable range of signal strength and polling response time for receivers sharing the same geographical indicator may be determined by a variety of methods, including:

Specific testing in one or more locations of response times and signal strength for a group of receivers. Furthermore, multiple receiver models may be tested to test for relative differences in signal strength and response time between receiver models Statistical testing of receivers with the same indicator of geographical location. Means, averages and other computations can be used to determine acceptable signal strength and poll response based on analysis of a sample or the totality of receivers with the same indicator of geographical location. The analysis may be replicated or subdivided for individual receiver types and models.

The acceptable range of a response indicator or combinations of response indicators of signal strength may be determined by establishing the upper and lower limits within which a specified number or percentage of the responses for a given set of receivers response qualifier is contained, referred to as hereafter as a discriminator. For example, if the discriminator is specified as 95%, and 95% of receivers with the same indicator of geographical location respond within 30 ms to 50 ms, then any receivers with a poll response time lower that 30 ms or higher than 50 ms may be deemed to have a high probability of being location outside of the intended geographical area.

The acceptable range of signal strength or poll delay may also be determined by identifying an acceptable difference between the receivers 16 with the highest value and lowest value for the indicator. For example, the difference in poll delay between the slowest and fastest response for receivers on the account may be limited to 20 ms.

As an example, the following pseudo code can be used to generate the target list, where the poll delay from CA 20 for a receiver 16 is assumed to be in ms:

```
FOR ALL ACCOUNTS:
    GET RECEIVERS ON ACCOUNT FROM SMS 25
    IF MULTIPLE RECEIVERS ON ACCOUNT:
        GET POLL_DELAY FOR RECEIVERS FROM CA 20
        GET HIGHEST_POLL_DELAY
        GET LOWEST_POLL_DELAY
        IF (HIGHEST_POLL_DELAY -
            LOWEST_POLL_DELAY) > 20
            PUT ALL RECEIVERS ON ACCOUNT ON TARGET
            LIST
```

As a further example, if a specific receiver is identified in step 110 as the target for execution of the method, the following algorithm would implement the generation of the target list based on examination of the indicia of location or the receivers on the same account:

```
GET ACCOUNT FOR RECEIVER
    GET RECEIVERS ON ACCOUNT FROM SMS 25
    IF MULTIPLE RECEIVERS ON ACCOUNT:
        GET POLL_DELAY FOR RECEIVERS FROM CA 20
        GET HIGHEST_POLL_DELAY
        GET LOWEST_POLL_DELAY
        IF (HIGHEST_POLL_DELAY -
        LOWEST_POLL_DELAY) > 20
            PUT ALL RECEIVERS ON ACCOUNT ON TARGET
            LIST
```

Changes in Poll Characteristics

For the above methods, multiple instances of the poll response may be used. For example, an operator may choose to analyse the poll responses over a minimum number of days, and use the average signal strength and/or response time from multiple polls. Furthermore, the operator may choose to discard some values, such as the highest and/or lowest values, to compensate for what may be temporary or intermittent network or equipment problems, aberrations or states that could affect the measurement.

In one embodiment, a indicia of location of a receiver 16 is that it has a given communication path 70 or communication path 70 and one or more response characteristics on the communication path 70 such as signal strength and poll response delay taken at a given time identified as TIME1, and a second indicia of location is the same communication path 70 information for receiver 16 taken at TIME2. A change either of these characteristics without a corresponding change in another value such as the account or address may be an indication of unauthorized relocation of the receiver 16, degradation of communication equipment, tampering with equipment such as addition of a splitter or removal of a filter, or other problem that may require investigation or correction.

As an example, the following pseudo code can be used to generate the target list, and we use the poll response delay ("POLL_DELAY") at different times as the indicia of location. For a given receiver, the difference between poll delays at a different times is not expected to be greater than a specified number of ms, identified as MAX_DELAY:

```
FOR ALL RECEIVERS:
    GET ACCOUNT_NUMBER FROM SMS 25 AT TIME1
    # Get the communication path 70 characteristics
    GET COMM_INFO FROM CA 20 AT TIME1
    GET ACCOUNT_NUMBER FROM SMS25 AT TIME2
    GET COMM_INFO FROM CA 20 AT TIME2
    IF TIME1.ACCOUNT_NUMBER =
    TIME2.ACCOUNT_NUMBER:
        IF DIFFERENCE(TIME1.COMM_INFO.POLL_DELAY,
            TIME2.COMM_INFO.POLL_DELAY) >
            MAX_DELAY:
            PUT RECEIVER ON TARGET LIST
```

Receiver in Inventory State for Too Long

In one embodiment, a indicia of location of a receiver 16 is that it is in a state within which a receiver should not be for longer than a specified time MAX_STATE_TIME, with the information obtained on the state of receiver 16 at a given time identified as TIME1, and a second indicia of location is the information on receiver 16 being taken at TIME2, and the time difference between TIME2 and TIME1 is greater than MAX_STATE_TIME. A receiver in such a state for more than MAX_STATE_TIME may need to be investigated and its status corrected.

Such states may include receiver testing, demonstration, or pre-delivery to a customer so that the receiver is immediately enabled. Such inventory states are typically intended to be temporary in nature, and are referred to herein as temporary inventory states. A receiver with such temporary inventory state may be referred to as being in a specific state, such as a "test state", "truck roll state", or other state. Different states may have different values of MAX_STATE_TIME associated with them.

By establishing a time limit time_limit within which a receiver may be within a certain state or within a defined group of states, the following steps can detect a receiver that is inappropriately configured on the system.

In the following pseudo-code example, receivers in state TEST_STATE are compared at two different times TIME1 and TIME2 which differ more than

```
MAX_STATE_TIME:
FOR ALL RECEIVERS IN TEST_STATE FROM SMS25 AT TIME 1:
    IF RECEIVER IN TEST_STATE FROM SMS25 AT TIME 2:
        PUT RECEIVER ON TARGET LIST
```

Receiver on Multiple Systems of Same Instance Type

In one embodiment, a indicia of location of a receiver 16 is that it is defined on one system such a CA20, SMS 25 or CS 11, and a second indicia of location is that the same receiver 16 is identified on a second instance of, respectively, CA 20, SMS 25 or CS 11.

Receivers may appear on multiple such systems because of errors in data entry, system configuration, inventory management, theft and other causes. Such entries can lead to inaccurate business statistics, loss of inventory and other problems.

As an example, when checking for the existing of a receiver on two SMS 25 systems, identified at SMS25-1 and SMS25-2, the following pseudo code can be used to generate the target list:

```
FOR ALL RECEIVERS ON SMS25-1:
    IF RECEIVER ON SMS25-2:
        PUT RECEIVER ON TARGET LIST
```

As a further example, if a specific receiver is identified in step 110 as the target for execution of the method, the following algorithm would implement the generation of the target list based on examination of the indicia of location or the receivers on the same account:

```
GET ACCOUNT FOR RECEIVER
FOR ALL RECEIVERS ON ACCOUNT ON SMS25-1:
    IF RECEIVER ON SMS25-2:
        PUT RECEIVER ON TARGET LIST
```

Turning to step 130 of FIG. 3, once target receiver list 200 has been generated, the network operator of network 10 may create a corrective action list for taking one or more corrective actions. Corrective actions for controlling inconsistencies in receiver indicia of location in network 10 may take many forms, including automated or manual methods of actions. Prior to the taking of corrective actions, the embodiment may optionally further confirm that one or more receivers 16 on the target receiver list 200 is in fact engaged in inappropriate usage. In some embodiments, such confirmation may include polling each receiver 16 identified by target receiver list 200.

Corrective actions may also be targeted at a particular receiver 16, at a component of network 10 used to control network access by the receiver 16, or at the user of the receiver 16. Furthermore, corrective action may be selected based on further queries and analysis.

Once generated, the corrective action list may also simply represent a list of target list receivers 16 and the inconsistencies in indicia of location identified for each receiver 16 in the target list 200.

Figure 6:
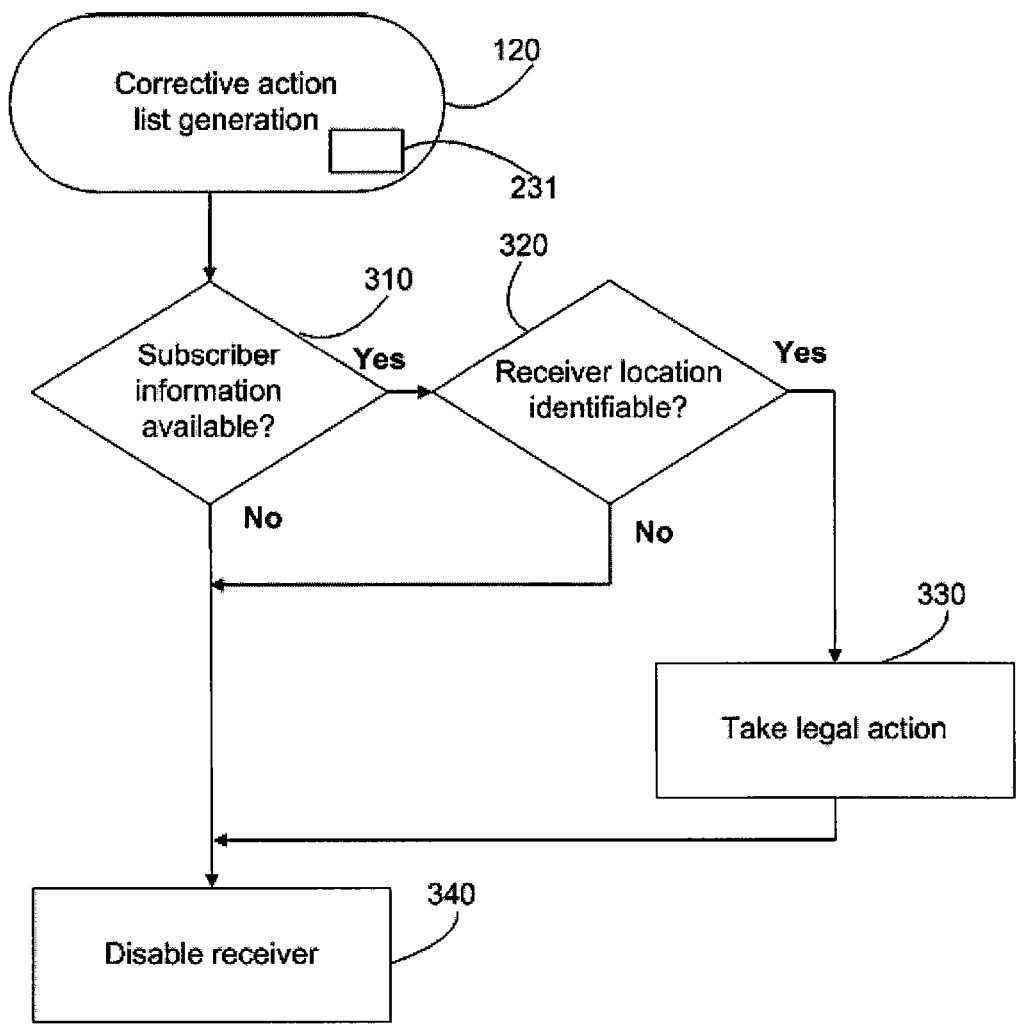
FIG. 6 is a flow diagram for taking corrective action for the method of FIG. 3 based on identification of a receiver location error.

By way of illustration, an example of corrective action list generation is provided below, where a list of receivers 16 which are on accounts on SMS 25 where the different receivers 16 on an account have different communication paths 70 indicating that at least one receiver 16 is in an inappropriate location By way of illustration, FIG. 6 provides a flowchart illustrating an example of the corrective action list generation 120 and corrective action undertaking 130 of that may take place if usage records are a consideration. In this example, the operator of network 10 may disable one or more particular receivers 16, or may take legal action against the alleged user of the receivers 16 before disabling the one or more receivers 16.

In this example, after step 110 of FIG. 3, step 120 of FIG. 3 is implemented by steps 310 and 320 of FIG. 6, and step 130 of FIG. 3 is implemented by steps 330 and 340 of FIG. 6.

Referring to FIG. 6, in step 310 a determination is made of whether subscriber information is available. This could include information from the account for the receiver on SMS 25. If no such record is available, then step 340 generates a command for disabling the receiver 16. Disabling receiver 16 may, for example, merely be limited to disabling a functional capability of receiver 16, such as disabling access to a group of service or service offering of network 10, as described below, or simply removing the receiver 16 from the inventory or records of SMS 25, CA 20 or other systems.

If usage records are available to positively identify a subscriber in step 310, then step 320 is taken to determine if the location of the receiver 16 can be identified. If the location cannot be identified, then step 340 generates a command for disabling the receiver 16. If within step 320 the location of the receiver 16 can be identified, then step 330 generates a command to take legal action against the alleged user of the receiver 16, and then step 340 is taken to generate a command to disable the receiver 16.

The target receiver action list 200 may take different forms, including:

Display of receivers and associated problem identified
List of receivers 16 on which to take one or more technical, legal or other actions;
Lists of commands to be manually entered on one or more systems;
List of commands to be entered in batch, terminal emulation, operator emulation or other method in an automated manner; and List of receivers 16 and related inconsistencies in indicia of location.

Based on the results of these further queries or analysis, the operator may choose different corrective actions. These could include and are not limited to:

Disabling of one or more receiver 16 features or functions on one or more systems. Such features could include access to specific services or groups of services, such as channels, PPV, IPPV, iTV or others, within one or more systems such as CA 20, SMS 25, PPV, IPPV, iTV or other systems;

Disabling one or more network features or functions or functions, such as addressable cable tap connections for the receiver 16;

Attempting to identify the location of the receiver 16 using signal analysis, cable tracking, tap audits, prior subscription records or other methods;

Correcting the values of the indicia of location within one or more systems to correspond to values expected for correctly configured receivers 16 on network 10;

Launching legal, civil or other claims, directly or through third parties, against alleged users or facilitators of usage of receivers 16 in inappropriate locations; and Providing a list of the receivers 16 and inconsistencies found for such receivers 16 to one or more third parties such as, for example, the provider or providers of the systems containing the inconsistent indicia of location. This option may be desirable for the network operator for several reasons, which could include a third party's unwillingness to allow operators to make particular types of direct corrections, the network operator not having staff with the required skill or training to make the corrections, or other reasons.

Once a target receiver list 200 has been generated, the operator of network 10 may optionally choose to take corrective action in an attempt to disable one or more capabilities, services or other function of a receiver 16 identified by the list 200, to disable such a receiver 16, to provide some form of advisory to the user that inappropriate usage is taking place at such receiver 16, or to identify the user or location of the receiver 16.

In one embodiment, the optional corrective action undertaking step 130 referred to in FIG. 3 may issue commands to disable one or more of the receivers 16 in the target list 200. For one or more receivers 16 in the target list 200, a set of one or more commands is created to disable the receiver 16. The resulting target receiver commands list 231 may be provided as one or more sets of commands to CA 20. One or more commands may be used for each receiver 16, and the format of each command and the resulting list will be based on identifiers for each receiver 16, the type of receiver 16, and the capabilities of the conditional access system 20. Where multiple receiver 16 types are supported, and multiple conditional access systems 20 are in use, the list of commands may be separated into separate lists for execution on each conditional access system 20 type. It will be appreciated that the format and selection of the commands, and the method for loading and executing the commands on the conditional access systems 20 may differ in different embodiments.

In one embodiment, the command selected for transmission to each receiver 16 could be a "cancel all services" command. Such a command would disable all services available to the receiver 16.

In one embodiment, the optional corrective action undertaking step 130 referred to in FIG. 30 may issue one or more commands to remove the receiver from one or more given system such as a CA 20, SMS 25 or CS 11

In another embodiment, the receiver or a subsystem or component of the receiver 16 may have been compromised in a manner that prevents one or more specific commands from executing on the receiver 16. In such cases, the commands that are prevented from executing may be those that are transmitted by SMS 25 to CA 20 for cancellation or disabling of services, of capabilities of the receiver 16, or the receiver 16 itself. The range of commands that SMS 25 is configured or programmed to send to CA 20 system may be a subset of the commands available to the CA 20 subsystem. In such cases, the commands used in the command list 231 may be selected specifically because they are different from those normally used by SMS 25.

The appropriate commands to be generated in command list 231 may be dependent on the conditional access system 20 and receivers 16, or will be apparent to those of skill in the art.

The corrective actions that may be undertaken may consist of the disabling of means of communication to the receiver 16. In one embodiment, the connection of a cable to the home of a customer may be controlled by an addressable tap, which is a device that allows the physical cable connection to a receiver 16 be remotely disabled. The secondary list 235 or the inventory list may be generated in a manner that includes information required to address the tap for the location in which receiver 16 is assumed to be located. The corrective actions may also query another system or combinations of systems such as SMS 25 or a system used to manage addressable taps to determine the information required to address the tap for a given receiver 16. The corrective action may then provide a list of addresses or a batch of commands to a tap management system or other system used to remotely control the taps to disable the taps related to the target receivers 16.

In other embodiments, the corrective action may consist of the issuing of a warning message to the user of a receiver 16 on the target list 200, separately or in combination with the disabling of a service, or a set of services on the receiver 16. The message may take the form of an on-screen message directed to one or more receivers 16 in the target list 200. Another method of presenting the message is to create a channel or other service that will be used and configured for communicating messages to one or more of the receivers 16 in the target list 200. Commands generated for one of more of the receivers 16 in the target list 200 will be selected to authorize the receivers 16 for the service. Messages may direct the user of the receiver 16 to take certain steps such as contacting the operator or a proxy for the operator to aid in identification of the user or in recovery of the receiver 16.

In still other embodiments, corrective action command list 231 may take different measures to disable the receiver 16. These may include and are not limited to:

Disabling one or more capabilities of the receiver 16, or the entire receiver 16;

Displaying a message to the user of the receiver 16;

Reporting the potential inappropriate usage to another network component or system;

Generating a report identifying the receiver 16 and any inconsistency in indicia of location showing receiver 16 as potentially engaging in inappropriate usage in network 10; and Reporting the inappropriate usage event to a conditional access system 20 component within, peripheral to, or external to the receiver 16.

It will be appreciated that other measures may be undertaken in other embodiments as will be available based on particular receiver 16 and conditional access system 20 implementations.

Further still in other embodiments, the corrective action command list 231 may optimize the target receiver commands based on the capabilities of conditional access system 20 to reduce the number or commands or the bandwidth used by the commands. These optimizations may include various methods of directing a single command to multiple receivers 16, and may be dependent on the type of CA system use, as known to those of skill in the art.

The corrective action undertaking step 130 can occur in either automated or manual ways. The volume and timing of corrective actions may be controlled to prevent interference with other network operations in network 10.

For example, in one embodiment corrective action undertaking step 130 may be done on CA 20 and may require a level of flow control to ensure that the execution and transmission of commands to the receivers 16 does not impede the operation of the conditional access system 20 and network or other services on network 10. Measures may include, but are not limited to:

Creation of a set of smaller batches for separate execution;
Creation of instructions on when to issue the full list or batches from the list;
Automatic scheduling of the full list or batches from the list;
Limiting of the number of commands issued within a given time period;
Limiting the rate at which commands are issued to the system; and
Limiting the times and days on which commands are issued.

Services that may be affected on network 10 include network message volumes from a variety of systems and services, such as pay-per-view services and receiver 16 authorization traffic; the volume of calls to the network operator's customer support center, which may see an increased work volume when receivers 16 are being cancelled as described above.

In another example of taking corrective action, CA 20, SMS 25, CS 11 or other systems used to undertake corrective actions step 130 may not provide an interface for batch issuing of commands. In such a case, a computer can be used to connect to a terminal, network or other interface available on network 10. The computer may emulate the actions of a human operator by reading prompts and issuing commands based on the prompts. Programmable interfaces to terminal emulators can be used, or test tools that simulate user interaction with a graphical user interface may also be used. Other methods of emulating a user through a computer system's user interfaces are known to those of skill in the art.

Other interfaces or methods may be used to undertake corrective action. They may include, but are not limited to:
Batch command interfaces;
Programming or data interfaces, either directly on the same system or through network connections;
Direct access to data stores such as files and databases;
Providing the list of receivers 16 and inconsistencies in indicia of location or corrective actions to one or more third parties such as one or more of the providers of the affected systems; and
Where action is to be taken against the user of a receiver 16, providing appropriate information on the user and activity to lawyers, paralegals, bailiffs or other agents to take appropriate actions against the user.

As described herein, the identification of a receiver 16 within the target list 200 may be considered sufficient to warrant taking civil, legal or other action against the user of the receiver 16 based on violation of user agreements, contracts, local, state, provincial, national, international or other forms laws or regulations governing the use of the receiver 16. As an example, in the embodiments described above, the multiple communication paths 70 from a set of receivers 16 on an account may be considered as evidence that a user was engaged in inappropriate receiver usage.

Acquisition of Information

A system is now described for implementing the methods of the invention described herein. An access and reporting system 105, referred to hereafter as ACRS 105, may consist of one or more processors with one or more data storage facilities such as a database, file system or other storage medium known to those of skill in the art. The ACRS 105 is configured with software to access data from target systems such as CA 20, SMS 25 and CS 11.

ACRS 105 Access Methods

The ACRS 105 can access the data on the CA 20, SMS 25 and CS 11 in a variety of ways. A single ACRS 105 may use different access methods for different tasks to suit operator preferences, performance issues, and other requirements In one embodiment, the ACRS 105 uses a database access method DAM 430 provided by the vendor of the database or a third party to access the Data server 440 200. Examples include the Informix Connect product for Informix database, the TDS product for the Sybase database, and others for respective database managers. Accessing the data using such a mechanisms is usually done using the SQL or similar computer language. Furthermore, For illustrative purposes in the following description, the ACSR 105 is shown accessing data from a CA 20. This is used as an example, and for the purposes of the description, CA 20 can be substituted for SMS 25, CS 11, and multiples and combinations thereof.

Figure 7:
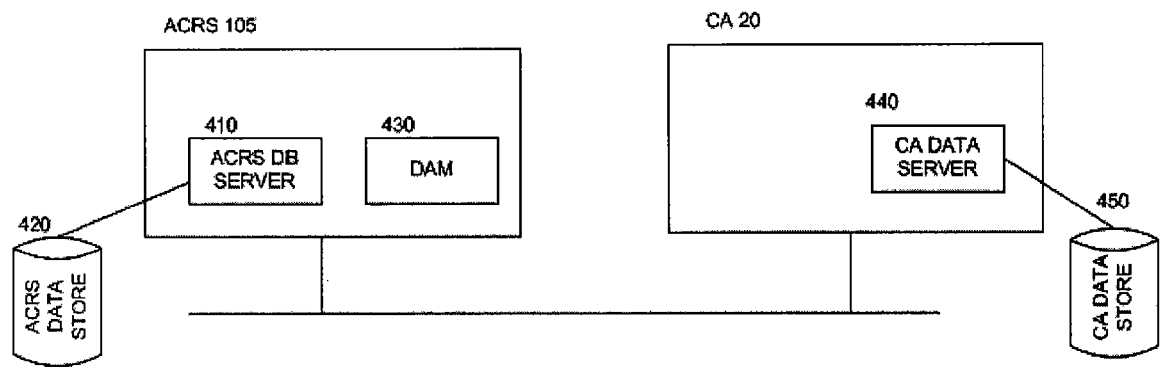
FIG. 7 shows data accesses from a system implementing a method of the invention to a single conditional access system data store.

FIG. 7 shows a possible configuration for ACRS 105 accessing data from a CA 20. ACRS 105 has a data server process such as a database server, shown here as database 410, with a data store 420 for storing the data. The CA 20 has its own software for storing data, shown here as a data server 440, with a data store 450 for showing the data. ACRS 105 is equipped with software to access the data in data store 450 through data server 440, and the software is referred to as a data access manager 430 or DAM 430. The DAM 430 is shown as residing on the ACRS 105 system. A variety of configurations are possible, including DAM 430 processes residing on the same computer as the ACRS 105, or combinations of processes residing on multiple ACRS 105 system. Furthermore, the DAM 430 may provide a variety of interfaces. As an example, a database may have its own defined communication protocol, such as Sybase's own protocol. The DAM 430 may provide facilities to use ODBC, a standard database access protocol as implemented by Microsoft Corporation, Bellevue, Wash. and other companies. The operating system, in turn, may need to provide standard interfaces to allow processes to use the ODBC protocol.

Data on the various target system such as CA 20, SMS 25 and CS 11 can be stored and accessible in a variety of formats with appropriate implementations of DAM 430, data server 440 and data store 450. Examples include and are not limited to instances and combinations of:

Data server 440 implemented as an http or xml server, with data store 450 as the files, databases and other data facilities accessible to the http or xml server, with DAM 430 implemented as an http or xml client process
Data server 440 implemented as file access software such as an ftp server, a network file server or other method for making files accessible on a network, with data store 450 as the files accessible to the file system and DAM 430 implemented as client process for the file access software.

Data server 440 implemented as a database software or database access method, using SQL or other query language, directly through the network connection, application, application programming interfaces (API) provided by the supplier of the database or third parties, or indirectly through application infrastructure or communication facilities such as those provided by J2EE, JDBC, ODBC and other interfaces and subsystems as known to those of skill in the art, with data store 450 implemented as one or more databases accessible to the database software or database access method, and DAM 430 implementing a client software for accessing the database software or database access method.

Data server 440 implemented as an application which is accessible from a terminal session connection (telnet, 3270, etc), and data store 450 as the data accessible to the terminal application, and DAM 430 being a terminal emulation process allowing programmed interaction in a manner that simulates the keystrokes of a human operator on the terminal and which reads the data presented on the terminal.

Other mechanisms may be available for storing and transferring data. For technological or operational preference reasons there are may not be network access facilities, in which case the data access 440 may consists of writing data to a form of removable media as data store 450 such as backup tapes, files, disks and other media. DAM 430 would be the process of physically moving the removable media to the ACRS 105 and loading it with applicable media reader and software.

The selection of the acquisition is method may be dependent on one or more of:

Features available on the target systems. Target systems may provide a variety of facilities and methods for data transfer, and the data may be accessed or transferred in a variety of formats.

Performance considerations. The method of the transfer may be selected or applied in a manner that reduces the risk of affecting the target system's own performance.

Security and operational considerations. For perceived or real security or operational reasons, the network operator or provider of the target systems may wish to restrict access to certain features or forms of data. For instance, it may be technically possible but not permitted to have direct access to a database engine, precluding both a method (direct communication with database using SQL through ODBC or custom database protocol) and a form (direct table access) of the data. In such a care, reporting tools provide by the vendor or third parties may be able to create reports or extracts with the data required, and the data can then be transferred using another method.

The CA 20 database server 440 may provide a variety of security mechanisms to control or prevent access to its data. The DAM 430 and other facilities of the ACRS 105 may implement additional mechanisms to improve security of the perception of security. These optionally include at least one of the following:

User/account configuration on the CA 20 or component of the CA 20 such as a database server 440 to limit or control the type of access (read-only), or the data which can be accessed (specific tables, databases within the database server, operations allowed, etc.)

DAM 430 configuration to limit or control the type of access (read-only, etc.) or the data which can be accessed (tables, databases, etc.). For example, an ODBC-type or database manufacture specific link can be configured for read-only access, or only to access certain tables.

Application or application environment controls. The application or application environment can restrict the facilities available to the user. Such an environment may limit the type of access by controlling which commands or types of commands can flow to the server, or simply only provide facilities and functions with a pre-defined and limited set of capabilities.

Data Extraction Methodologies

The DAM 430 may extract the data in different ways. Large volumes of data can be extracted, so that once the data is extracted, subsequent requests will not access the CA 20. Specific data can be accessed separately so that the most up-to-date data is acquired.

In one embodiment, the DAM 430 acquires the data from a list of one or more tables from the Data server 440. The data from these tables is stored within the ACRS 105 data store 420. Furthermore, the data may be filtered to remove certain columns or types of columns, or to convert data to a different format. This method can provide significant advantages for running reports or data analysis on the ACRS 105. As an example, running an SQL query against two or more tables on the Data server 440 can result in a requirement for significant memory and processing resources to read and combine the data. Running a subsequent instance of the same report or a report using one or more of the same tables may result in the same data being read again. By extracting the tables to the ACRS 105, data is only accessed once, and computing load is reduced on the CA 20.

ACRS 105 may have multiple users or processes with requirements to access data from the Data server 440. Access may be restricted or controlled based on variety of factors, such as user, process, time of day and other factors.

In one embodiment, a given set of users or processes is restricted to only accessing data from the ACRS 105 database server which has been extracted from the CA 20. These users are not allowed to access the CA 20 directly. Methods for this restriction can include:

Limiting access to certain processes

Limiting access to certain interfaces to processes

Limiting access to certain database access interfaces (ODBC, etc.)

Other mechanisms may be known to those of skill in the art.

In another embodiment, accessing data directly from the CA 20 may be restricted to certain times of day. This may be required to ensure the high-priority processing is unhindered or unaffected by the additional workload that would be cause by data accesses from the ACRS 105. Furthermore, certain functions operating on a CA 20 such as backup or upgrade operations may preclude any active external access during the performance of these functions on the CA 20.

Connections to databases are typically logical, as several connections can be made to a database over single network connection to a database server. A database server may allocate memory, processing and other resources to each connection. A connection may further provide the ability to handle multiple cursors, where each cursor maintains a query session context for a sequence of one or more queries. These concepts of cursors and connections are well known to those of skill in the art and implemented in the most common database systems.

In one embodiment, a DAM 430 may use one or more connections to a given Data server 440. For example, with database engines, processes access to the database by opening a connection to the database. Each connection to the database results in the database allocating memory and potentially other resources to the connection. Furthermore, using a single connection or managing a single connection so that only one query can execute at a time can reduce the potential for multiple ACRS 105 queries happening at the same time on the CA 20 and therefore act as a throttling process.

Figure 9:
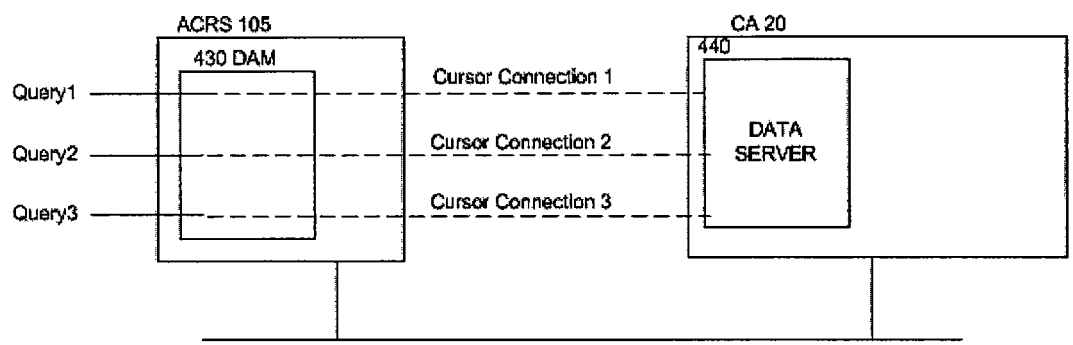
FIG. 9 shows multiple data access paths from a system implementing a method of the invention using individual connections to a conditional access system data store.

FIG. 9 shows a simple example, where Query 1, Query2 and Query3 each have a separate connection to the database through the DAM.

In another embodiment, separate tasks, classes or groups of tasks, users or groups of users may each have their own connection or set of connections. For example, the extraction of a table or set of tables may take a significant amount of time, and could cause unacceptable delays for other queries queued behind the table extraction. As an example, in FIG. 10 the table extraction process 160 issues queries through its own database connection in a manner that allows the table extraction queries would run in parallel with the other queries.

As another example, a group of users such as a group of technical service representatives (TSRs) handling technical escalations for a large call center may need to relatively frequently access detailed information. The group of users of the application or an application may be configured to use one or more connections that remain open to make subsequent queries faster and minimise the resources used on the target systems such as the CA 20, SMS 25, CS 11 or other systems.

Figure 10:
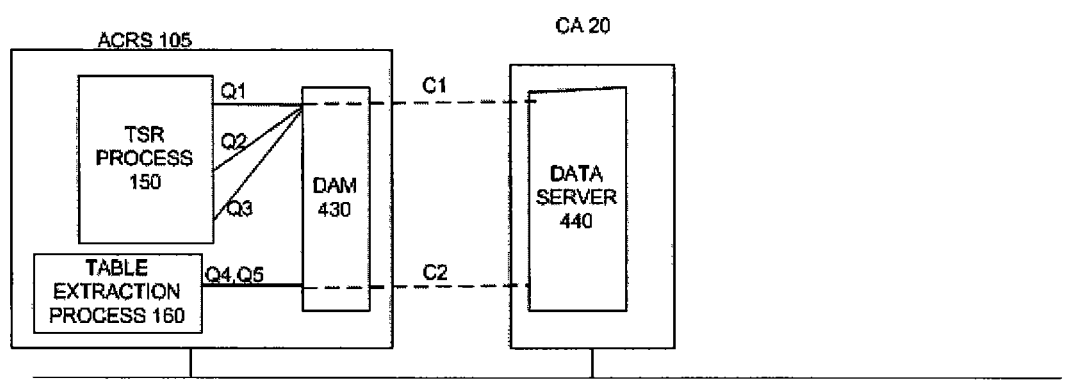
FIG. 10 shows multiple data accesses using different methods from multiple application categories from a system implementing a method of the invention using individual connections to a conditional access system data store.

Also in the example of FIG. 10, queries from a set of TSR can be flowing from one or more TSR processes 150 to a single to the DAM 430, which then processes the queries through connections C1 to Data server 440. Implementations of mechanisms to process multiple queries through a single connection may provide sequential and or concurrent query submission and processing through a single connection, and the ability to provide concurrent processing (also referred to as "multiple threads") may be configurable.

In another embodiment, a database connection is only established for the duration of a query or set of queries. The ACRS 105 may only need to access the Data server 440 on an infrequent basis. It may therefore not be necessary to maintain an open database connection. While the opening and closing of a connection may take some computing resource, no memory or other resources are used between queries. As an example of where this may be applicable, technical head-end staff may only access receiver information from the CA 20 on an occasional basis. It may therefore be desirable to only leave the connection in place for the duration of a query.

Multiple ACRS 105, Single Target System Configurations

Configurations may exist where one or more ACRS 105 systems are required to access data from one or more ACRS 105 target systems. Examples of requirements may include and are not limited to redundancy configurations where a backup system is required; performance issues, where the volume of query, application, analysis or other processing work may require additional resources; and security, where a system may require configuration in a manner that allows access to extracted data but not direct access to the CA 20.

Figure 8:
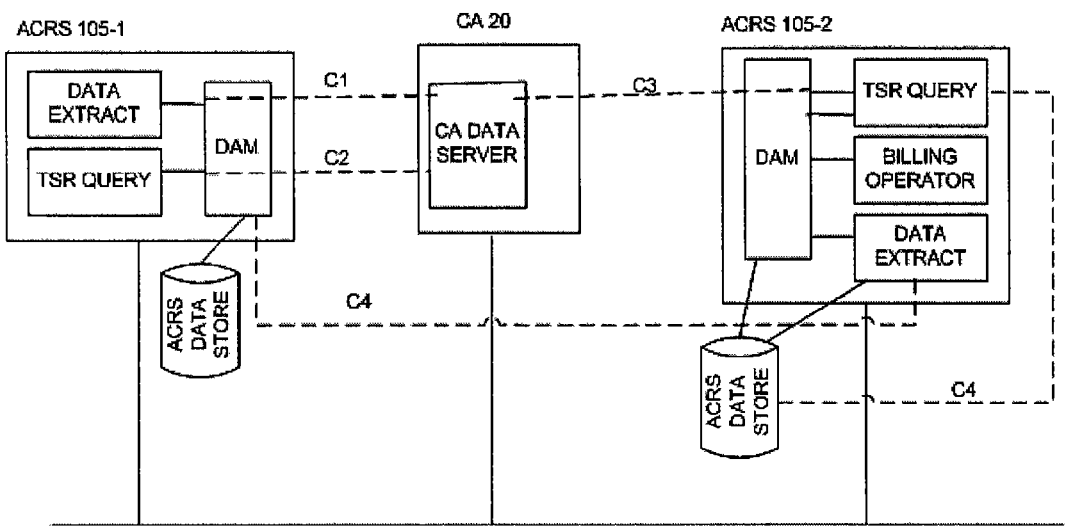
FIG. 8 shows data accesses from two systems implementing a method of the invention to a single conditional access system data store.

FIG. 8 shows a head with an ACRS 105-1, and instance of an ACRS 105, and a CA 20. ACRS 105-2 is a second instance of an ACRS 105.

In one embodiment, for data extracts (tables, etc.), only ACRS 105-1 may be configured to pull the extracts directly from CA 20. ACRS 105-2, to obtain the same data, may copy all or portions of the ACRS 105 database 120 from ACRS 105-1.

In another embodiment, facilities such as replication capabilities of a database may be used to obtain data to populate or keep up-to-date a second ACRS 105 from the database of the first ACRS 105. Various commercial databases include such capabilities either as standard or optional features, as is known to those of skill in the art.

In another embodiment, the data obtained by ACRS 105 from two or more instances or combinations of CA 20, SMS 25 or SMS is acquired in a manner or at a time that ensures that the data from said two or more systems is synchronized so that any data pertaining to a given at least one data element for said one of two or more systems properly corresponds to the data related to said given at least one data element on the other of said two or more systems.

Multiple Sets or Generations of Data Extracts

ACRS 105 may retain two or more sets of data collected at different times. This different time may be a specified time interval. The availability of data collected at different times allows other comparisons to be made to identify potential unauthorized usage and other problems as described herein. The methods of the present invention as described herein can be applied to all receivers on the applicable systems, to groups of receivers, or, where applicable, to single receivers.

In one embodiment, the software of the ACRS system is implemented with software and interfaces to allow entry of a receiver identifier or identifier associated with a receiver or a group of receivers, and then to exercise the methods of the invention against the specific receiver or a set of receivers associated with the identifier. Examples of an identifier for a receiver or a group of receivers can include a receiver serial number, an account number, a customer phone number, a communication path, a zip code, an account status and others.

Figure 11:
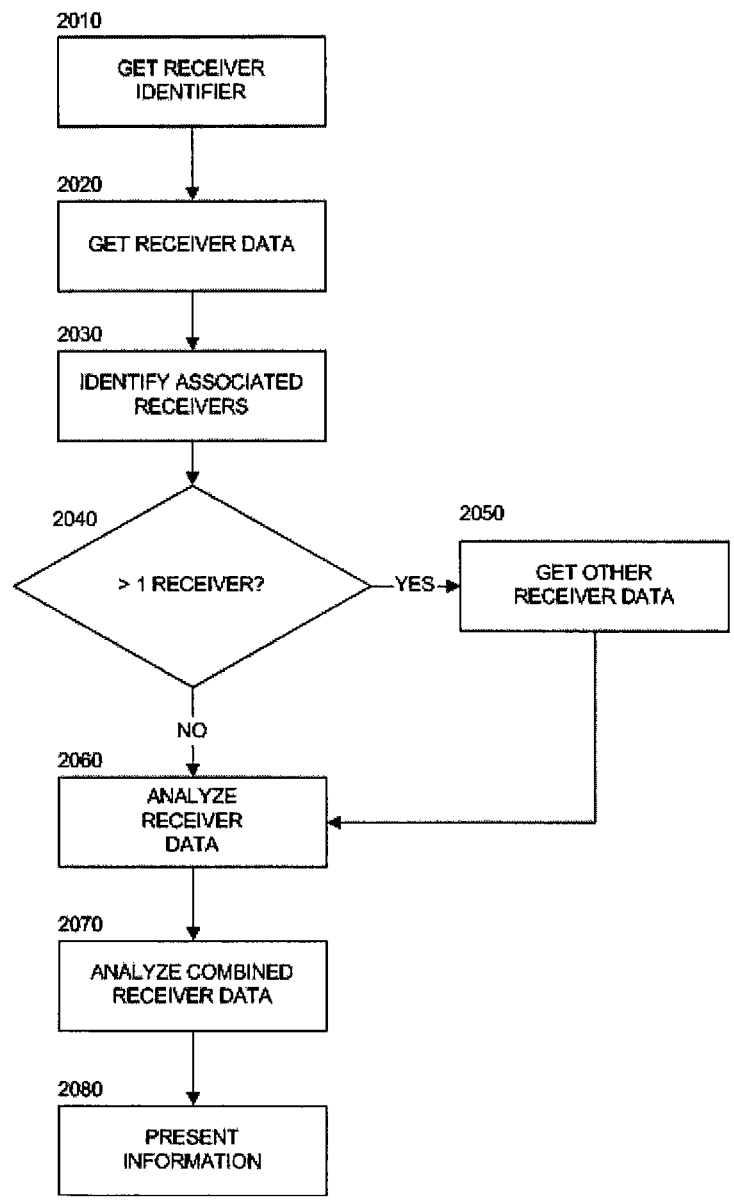
FIG. 11 is a flow diagram for accessing information on one or more receivers based on a receiver identifier.

FIG. 11 shows an embodiment of an example of steps required for a system implementing the method of the invention described herein. The steps are summarised here with detail following:

In step 2010, an identifier for a receiver instance (as described herein) is provided for a receiver.

In step 2020, the information on the receiver is acquired. This information may come from multiple systems.

In step 2030, information on the existence of receivers associated with the said receiver instance is acquired.

In step 2040, if other receivers are deemed to be associated with said receiver instance, then step 2050 is undertaken to acquire the information for said other receivers acquired.

Step 2010—Receiver or Group of Receivers Identification

The receiver identifier is specified. This is typically a receiver instance, but may include other information, explicitly or implicitly, to direct the subsequent steps. Furthermore, the subsequent steps may acquire said other information explicitly or implicitly, and may acquire set information through the process of step 2010 or independently. Examples of said other information include and are not limited to:

User permissions

Figure 12:
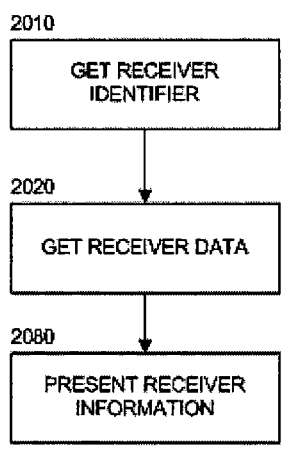
FIG. 12 is a flow diagram for accessing information for a single receiver

User options selected, such as extent of information to provide, or specific direction on the source of the information Step 2020—Acquisition of Information Receiver data may be acquired in a variety of manners. It may be collected independently from a CA 20 system on paper, in a spreadsheet, database or other system. It may also be acquired from an ACRS 105 system as described herein, using any of the methods described for those systems. The information to be acquired my be implicit or explicit in the invocation of step 2020 or earlier step 2010, or may be directed, limited and/or constrained by factors such as:

User permissions, which may limit the process, method, type, detail level or other characteristic of the data being acquired A specific instance of the invocation of step 2020 or step 2010 with directs the data to be acquired or the processing steps to be taken on the data. For example, FIG. 12 shows a selection screen where a serial number is entered. The user can choose to access the data or portions of applicable data being requested for said receiver from the data already stored on ACRS 105, or directly from CA 20.

Figure 13:
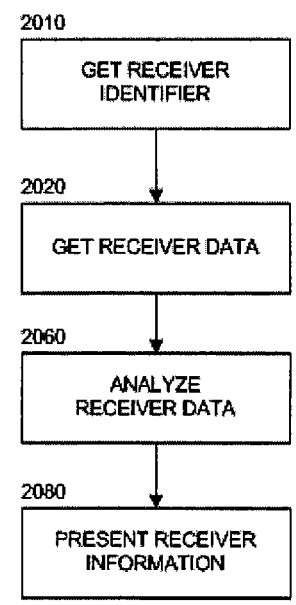
FIG. 13 is a flow diagram for accessing information and analysis for a single receiver

An indication of the data and/or processing to be acquired. In FIG. 13, the user selection at left indicates presents options for selection of data from the conditional access, conditional access and billing systems, conditional access and billing and VOD systems, and whether to perform an additional analysis on the data Step 2010 may take further steps to specifically identify a receiver. This method is applicable but not specific to embodiments of ACRS 105 where information on multiple CA 20 is available to said ACRS 105 in which a receiver has been defined on multiple systems.

In step 2011, the receiver is identified. As an example, the user can enter a receiver serial number.

In step 2012, instances of the receiver serial number are identified in one more CA 20 systems. This may be done manually by accessing data from the multiple systems comprising a CA 20, or using the facilities of an ACRS 105 as described herein. Examples of multiple instances can include and are not limited to separate definitions on multiple access control systems, billing systems, billing system subsystems, inventory management systems, etc.

In step 2013, a check is made on whether step 2012 has identified multiple instances. If multiple instances have been identified, in step 2014 a user can be presented with information to select a specific instance.

Step 2012 and/or step 2014 can include the retrieval additional data to aid the use in selection of the appropriate instance of the receiver. This information can be presented as part of step 2014. As an example, FIG. 26 shows an example of such a screen, where the billing system and state of the receiver are provided and allow the user to click on the particular receiver to select.

In step 2015, the receiver instance selected is passed on to the subsequent steps of the process. Step 2015 may pass on the receiver instance information in a manner than uniquely identifies the receiver by including, along with the user input, information obtained in step 2012 or step 2014 to further qualify the receiver. As an example, step 2015 can pass along the receiver instance as the serial number entered and an identifier for the conditional access system and billing system of the receiver as selected in step 2014.

Further limitations, constraints or directives which may be applied to the acquisition of data are as described in the earlier ACRS 105 description.

Optional Step 2030: Identify Associated Receivers

In optional step 2030, other receivers associated with said receiver instance are optionally identified using information from any or all of the systems comprising CA 20. Such receivers may be those within a group of receivers as defined herein, such as the receivers on the same account, or sharing a common geographical, network, technical or other characteristic for which receivers would expect to be in one or more common locations, and may further consist of, as examples and not limited to:

All receivers on the same account

All receivers and cable modems associated with the same house or building by using account, address, postal code or other information All receivers on the same communication path 70.

Optional Step 2040

Optional Step 2040 verifies if additional receivers associated with the receiver instance selected have been identified. If so, step 2050 is undertaken to access data from those receivers.

Optional Step 2050

Optional Step 2050 may be a separate step as indicated, or may have been undertaken as part of step 2030. For example, a query requesting identification of other receivers may also provide the data for those receivers. Furthermore, the steps of 2020, 2030, 2040 and 2050 can technically be consolidated into a single step 2020 using a more complex query. A pseudo code example for retrieval of information for receiver 123456:

```
SELECT ALL INFORMATION
    FROM RECEIVER TABLES
    WHERE RECEIVER_ACCOUNT IS
        (SELECT RECEIVER_ACCOUNT
        FROM RECEIVER_TABLES
            WHERE RECEIVER_SERIAL = 123456)
```

Such a simplified example is shown in FIG. 12 and FIG. 13, which can be used to provide information for a single receiver or all receivers on an account or within another grouping.

The separation of steps can be advantageous for performance and other reasons, as the selection of data for the other receivers within the receiver group may be different than the data selected for the specified receiver.

In one embodiment, the information acquired for said other receivers may consist of a subset of the information provided for said specified receiver. As an example, FIG. 27 shows detailed information for the specified receiver, and a summary of information for the other receivers on the account. This summary may include the specified receiver, as shown in FIG. 9.

In another embodiment, the information acquired for said other receivers may be acquired in a manner different from the acquisition of information of the said specified receiver. For example, the detailed information on the specified receiver in FIG. 9 may have been retrieved from the conditional access system, while the information on the other receivers may have been acquired from data stored on a system such as, for example, an ACRS 105, which was retrieved earlier as an extract from the conditional access system or other systems comprising CA 20. Various methods of acquiring data are defined in the description herein of ACRS 105.

In another embodiment, when acquiring data for different receivers within a groups, different access methods may be required to obtain the data for the receivers. For example, if the serial number for a television receiver was specified, the particular request made may require information on both television receivers and cable modems related to the account. In such a case, ACRS 105 may access information from differing CA 20 system types for the cable modems and television receivers, which may have different databases and data store types.

Steps 2060 and 2070

In step 2060 and 2070, the data acquired is analyzed using the methods described herein for identifying inconsistencies in receiver indicia of location. In step 2060, one or more of the methods applicable to identifying inconsistencies in indicia of location for a single receiver are applied to each receiver forming part of the selection from steps 2010 and 2030. In step 2070, one or more of the methods applicable to identifying inconsistencies in indicia of location for two or more receivers are applied.

Step 2080: Present Information

In step 2080, the information from the preceding steps is presented as an implementation of the Corrective Action Undertaking in step 130 of FIG. 3. As an example, the step may be implemented as presentation of the data. As an example, in FIG. 15, this is done by presenting information on all receivers on an account when one receiver on the account is specified, and then identifying CounterStryx Status message box at the bottom of the screen that there is an upstream path discrepancy between receivers on the account.

In the embodiment of FIG. 12, user permissions, configuration options or application requirements may be such that only information for a single receiver is to be presented. In such a case, only steps 2010, 2020 and 2080 are required.

In the embodiment of FIG. 13, only data for a single receiver is required, as is the case in the embodiment of FIG. 12. However, step 2060 is added to analyse the receiver for problems.

Figure 14:
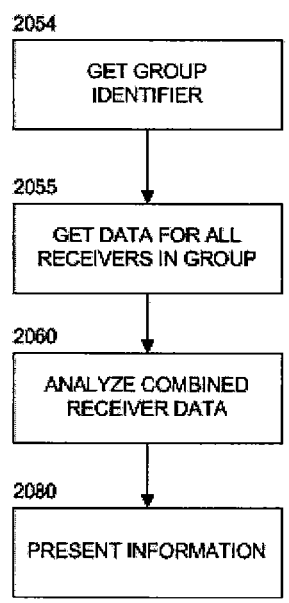
FIG. 14 is a screen displaying a discrepancy identifying multiple instances of a receiver and allow selection of a specific instance of the receiver.

In the embodiment of FIG. 14, the receiver identifier instead consists of an identifier for a group of receivers. Step 2054 replaces step 2010 of FIG. 11. As an example, the group identifier could be an account number. In Step 2055, all the required information for the receivers in the group is acquired.

FIG. 16 shows an example of a screen display of an application forming part of step 2010 of FIG. 11. A screen is presented where the user can specify a receiver serial number or an account number.

In another embodiment, a system implementing the methods of the invention may allow a user to select one or more data sources for the receiver or set of receivers on which to apply the methods of the invention. As an example, an ACRS 105 may have extracted a full set of receiver data from multiple CA 20 and SMS 25 systems. The selector box of FIG. 16 displaying "MAXXIAN TEST DAC" allows the user to specify which CA 20 system to query for the receiver. The buttons beside the serial number entry box labelled "From Current", "From DAC/DNCS" and "Search All" will direct the search for the receiver to respectively access the required data in different ways. The "From Current" button would obtain the data from data already extracted from CA 20 instance "Maxxian DAC" and stored on ACRS 105. The "From DAC/DNCS" button would obtain the data directly from CA 20 instance "Maxxian DAC. The "Search All" button would check all CA20 instances known to the system for instances of the receiver. Such a search could go directly to each CA 20, or could use a combined data set on ACRS 105 consisting of receiver lists extracted from each CA 20.

FIG. 17 shows an example of a screen illustrating both steps 2080 and step 2010 of FIG. 11. As a result of execution of a step 2010 in which a receiver 16 serial number was entered, it was determined by applying a method of the present invention that the specified receiver is erroneously defined on two systems. The screen identifies this fact along with the systems involved as an implementation of step 2080, and, as an implementation of step 2010, allows the user to selected the specific instance of receiver 16 by clicking on the appropriate instance.

In one embodiment, set-top information from heterogeneous systems is displayed in a common format and with common presentation tools. For example, the displays FIG. 15 is used to display information for either Motorola or Scientific Atlanta receivers In another embodiment, a CA 20 system is a system for managing cable modems, and another CA 20 system is a system for managing television receivers. While these are different receiver types, they are associated with user accounts on one or more SMS 25. In such a case, the cable modems and television receivers are both considered instances of receivers 16, and can be presented and analysed using the methods of the invention.

In another embodiment a system for managing deployment of cable modems may use a different identifier than the system for managing television receivers for the same communication path 70. In such an instance, a mapping may have to be created to associate a given cable modem identifier for communication path 70 with a given identifier for the television receiver communication path 70. Such a mapping may require accessing data from other sources which may or may not be available in computer readable form, such as plant cabling blueprints and other documentation.

In some embodiments, network 10 is a cable television distribution network, with set-top box television receivers 16. Other embodiments of the invention may be useful in other receivers 16 and networks 10 such as:

Television distribution networks, whether wired or wireless, or analog or digital, such as cable television, multipoint multichannel distribution system (MMDS) microwave, terrestrial broadcast, switched networks such as high-speed digital subscriber loop (DSL) and fibre-optic based networks;

Switched and broadcast networks for distribution of other forms of audio, video, data, games, software or other forms of digital content, including cellular telephone networks, gaming networks for video games, digital radio networks, the Internet, and others;

Receiving devices such as cellular telephones, personal digital assistants (PDAs), cable or DSL modems, personal computers, home entertainment systems, video game consoles, televisions with built-in receivers, and other devices. The devices may be designed for real-time playback, for downloading of content for subsequent playback, or for both; and Services and related systems from which receivers may receive services and which may contain receiver characteristics such as indicia of location may include communication storage systems such as voice mail, e-mail or other systems; music, video or other content access systems; telephony, instant messaging, push-to-talk, text messaging or other one-way, two-way, one-to-many or many-to-many communications systems; data, application or other service access such as the Internet or services to allow access to the Internet or other networks.

The embodiments described above may be deployed in conjunction with various subscriber receiving devices such as television set-top boxes, television and audio receivers, personal computers or personal digital assistants, mobile telephone handsets or other handheld communication devices and the like. Moreover, the embodiments may be used to detect inappropriate signal usage in relation to numerous categories of deliverable content in a network 10, whether in the form of voice, video, sound, executable applications, data or the like, including any combinations thereof.

It will be appreciated from the above examples that a myriad of components and methods may be used to implement embodiments of the present invention. Although the invention has been described with reference to certain specific embodiments, various modifications thereof will be apparent to those skilled in the art without departing from the spirit and scope of the invention as outlined in the claims appended hereto.

I claim:

1. A method for identifying location errors in a subscriber content delivery network for a set of at least one receivers, the method comprising the steps of:
   a) obtaining a first indicia of location for each receiver of the set of at least one receivers;
   b) obtaining a second indicia of location for each receiver of the set of at least one receivers;
   c) comparing said first indicia of location to said second indicia of location;
   d) for said each receiver, determining whether said first indicia of location is inconsistent with said second indicia of location to determine whether said each receiver has an inconsistency in its indicia of location; and
   wherein said first and second indicia of location comprise information that is indicative of a physical location associated with said each receiver, wherein at least one of said first and second indicia of location is obtained as aforesaid other than from information utilized by a conditional access system associated with said subscriber content delivery network, and wherein the conditional access system controls subscriber access to subscriber content delivered over said subscriber content delivery network.

2. The method of claim 1, wherein:
   said first indicia of location has a value associated with at least one location of a first set of at least one locations;
   said second indicia of location has a value associated with at least one location of a second set of at least one locations; and
   no location in said first set of locations is found in said second set of locations.

3. The method of claim 1, wherein:
   the set of at least one receivers having at least two receivers, each of said at least two receivers being intended for use in the same location;
   said first indicia of location is an indicator for a first receiver of said at least two receivers having a value associated with at least one location of a first set of locations;
   said second indicia of location is an indicator for a second receiver of said at least two receivers having a value associated with location of a second set of locations; and
   no location in said first set of locations is found in said second set of locations.

4. The method of claim 1, wherein:
   said first indicia of location is a first indicator value of location for one of said at least one receivers taken at a first time;
   said second indicia of location is the same as said first indicia of location but is a second indicator value of location for said one of said at least one receivers taken at a second time occurring after said first time; and
   an inconsistency is determined if the first indicator value is different from the second indicator value.

5. The method of claim 1, wherein:
   said first indicia of location is a first indicator value of inventory state for one of said set of at least one receivers taken at a first time;
   said second indicia of location is a second indicator value of inventory state for said one of said set of said at least one receivers taken at a second time occurring after said first time;
   the first indicator value matches the second indicator value; and
   an inconsistency is determined if the time difference between said first time and said second time is greater than a predetermined time for which said one of said set of said at least one receivers is intended to be in said inventory state.

6. The method of claim 1, wherein:
   said first indicia of location is an indicator that one of said at least one receivers is defined on a first instance of a first system that stores indicia of location of receivers;
   said second indicia of location is an indicator that the one of said set of said at least one receivers is defined on a second instance of a second system of the same type as said first instance of the first system; and
   an inconsistency is determined if it is known that a receiver should not be defined on more than one instance of a system of the same type.

7. The method of claim 1, wherein one of said first indicia of location and said second indicia of location is an identifier of a communication path that is associated with a set of at least one locations.

8. The method of claim 1, wherein one of said first indicia of location and said second indicia of location is an inventory state that is associated with a set of at least one locations.

9. The method of claim 1, wherein one of said first indicia of location and said second indicia of location is an indicator of signal strength that is usable as an indicator of a location on a communication path.

10. The method of claim 1, wherein one of said first indicia of location and said second indicia of location is an indicator of poll response time that is usable as an indicator of a location on a communication path.

11. The method of claim 1, wherein one of said first indicia of location and said second indicia of location are obtained from at least one of the sources of: a conditional access system, a subscriber management system, a video-on-demand service, a pay-per-view service, an impulse pay-per-view service, an interactive television system, and a receiver software delivery system.

12. The method of claim 11, wherein said first indicia of location is a first indicator value of location obtained at a first time for one of said set of at least one receivers, and said second indicia of location is the same as said first indicia of location but is a second indicator value of location obtained from the same source for the one of said set of said at least one receivers at a second time occurring after said first time.

13. The method of claim 12, wherein said second time is a predefined time period after said first time.

14. The method of claim 1, wherein if said first indicia of location is inconsistent with said at second indicia of location, a corrective action is executed to address the inconsistency between said first indicia of location and said second indicia of location.

15. The method of claim 14, wherein:
   one of said first indicia of location and said second indicia of location are retrieved from at least one record of any one or more of a conditional access system, a subscriber management system, a video-on-demand system, a pay-per-view system, an impulse pay-per-view system, and an interactive television system; and
   said corrective action includes updating at least one of said at least one records to cause said first indicia of location to become consistent with said second indicia of location.

16. The method of claim 14, wherein said corrective action includes disabling at least one functional capability of one of said at least one receivers.

17. The method of claim 14, wherein said corrective action includes launching a legal action against an alleged user one of one of said at least one receivers.

18. The method of claim 14, wherein said corrective action is executed in an automated manner.

19. The method of claim 14, wherein said corrective action is executed at a time tending to minimize disruption of operation of said network.

20. The method of claim 14, wherein said corrective action includes recording into a report information identifying said each receiver, said first indicia of location thereof and said second indicia of location thereof.

21. The method of claim 20, wherein said report is utilized to take at least one further corrective action.

22. The method of claim 21, wherein said report provided to a party, other than the party that performed said recording into said report, to take the at least one further corrective action.

23. A system for identifying location errors in a subscriber content delivery network for a set of at least one receivers, the system comprising:
an information gathering module for obtaining a first indicia of location for each receiver of the set of at least one receivers and for obtaining a second indicia of location for each receiver of the set of at least one receivers;
a comparing module for comparing said first indicia of location to said second indicia of location;
a determination module for determining whether said first indicia of location is inconsistent with said second indicia of location to determine whether said each receiver has an inconsistency in its indicia of location; and
wherein said first and second indicia of location comprise information that is indicative of a physical location associated with said each receiver, wherein at least one of said first and second indicia of location is obtained as aforesaid other than from information utilized by a conditional access system associated with said subscriber content delivery network, and wherein the conditional access system controls subscriber access to subscriber content delivered over said subscriber content delivery network.

24. The system of claim 23, wherein the information gathering module, the comparing module, and the determination module are each implemented in software on at least one computer connected to the network.

25. The system of claim 24, wherein the modules access one of the first and second indicia of location from a conditional access system, a subscriber management system, a video-on-demand system in communication with said network, a pay-per-view, an impulse pay-per-view, a software delivery system for receivers, and an interactive television.

26. The system of claim 25, wherein said first and second indicia of location from said set of at least one receivers and the indicia of location errors identified for same is presented to said at least one computer in a form of computer output.

27. The system of claim 26, wherein said computer output is provided on a read-only basis.

28. The system of claim 26, where access to said computer output is provided based on restricting access to subsets of the computer output based on at least one of user identification and user location information.

29. The system of claim 26, further comprising a data repository for storing said computer output.

30. The system of claim 29, therein the data repository stores multiple sets of said computer output that were produced at two or more different times.

* * * * *